(12) United States Patent
Ramamurthy et al.

(10) Patent No.: US 10,819,997 B2
(45) Date of Patent: Oct. 27, 2020

(54) ENCODING VIDEO DATA ACCORDING TO TARGET DECODING DEVICE DECODING COMPLEXITY

(71) Applicant: ARRIS Enterprises, Inc., Suwanee, GA (US)

(72) Inventors: Shailesh Ramamurthy, Bengaluru (IN); Padmagowri Pichumani, Bangalore (IN); Vinay Kulkarni, Bangalore (IN); Anil Kumar Nellore, Bangalore (IN); Padmassri Chandrashekar, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 564 days.

(21) Appl. No.: 15/002,372

(22) Filed: Jan. 20, 2016

(65) Prior Publication Data
US 2017/0208335 A1    Jul. 20, 2017

(51) Int. Cl.

| | |
|---|---|
| *H04N 19/436* | (2014.01) |
| *H04N 19/172* | (2014.01) |
| *H04N 19/156* | (2014.01) |
| *H04N 19/164* | (2014.01) |
| *H04N 19/103* | (2014.01) |
| *H04N 19/124* | (2014.01) |
| *H04N 19/176* | (2014.01) |
| *H04N 19/147* | (2014.01) |
| *H04N 19/137* | (2014.01) |

(Continued)

(52) U.S. Cl.
CPC ......... *H04N 19/436* (2014.11); *H04N 19/103* (2014.11); *H04N 19/156* (2014.11); *H04N 19/164* (2014.11); *H04N 19/172* (2014.11); *H04N 19/115* (2014.11); *H04N 19/122* (2014.11); *H04N 19/124* (2014.11); *H04N 19/137* (2014.11); *H04N 19/147* (2014.11); *H04N 19/176* (2014.11)

(58) Field of Classification Search
None
See application file for complete search history.

(56) References Cited

U.S. PATENT DOCUMENTS

| 2008/0062018 A1* | 3/2008 | Normile | H04N 19/154 |
| | | | 341/50 |
| 2008/0069247 A1* | 3/2008 | He | H04N 19/865 |
| | | | 375/240.29 |

(Continued)

FOREIGN PATENT DOCUMENTS

| WO | 2005002233 A1 | 1/2005 |

*Primary Examiner* — William C Vaughn, Jr.
*Assistant Examiner* — Joseph Daniel A Towe
(74) *Attorney, Agent, or Firm* — Chernoff, Vilhauer, McClung & Stenzel, LLP

(57) ABSTRACT

A method and system is provided for encoding video data according to target decoding device complexity. One embodiment is evidenced by a method of encoding video data for decoding on a target decoding device having parallel processing, comprising: receiving uncoded video data, computing a relationship between each of a plurality of encoding parameters and target decoding device decoding costs, selecting encoding parameters to minimize encoding costs, wherein the encoding costs include the target decoding device decoding costs, and encoding the uncoded video data according to the selected encoding parameters.

13 Claims, 29 Drawing Sheets

(51) Int. Cl.
*H04N 19/115* (2014.01)
*H04N 19/122* (2014.01)

(56) References Cited

U.S. PATENT DOCUMENTS

| | | | |
|---|---|---|---|
| 2015/0016543 A1* | 1/2015 | Rapaka | H04N 19/105 375/240.25 |
| 2015/0110118 A1* | 4/2015 | Ouedraogo | H04L 65/601 370/394 |
| 2016/0105675 A1* | 4/2016 | Tourapis | H04N 19/46 375/240.02 |

* cited by examiner

| 5 2 0 1 | 1 0 0 0 | 1 1 1 0 | 0 0 0 0 |
| 5 0 2 1 | 2 0 1 1 | 0 2 1 0 | 0 0 0 0 |
| 0 1 0 0 | 1 0 1 1 | 0 1 1 1 | 0 0 0 0 |
| 0 0 0 1 | 1 1 1 1 | 0 0 1 0 | 0 0 0 0 |

| 1 1 0 0 | 1 0 1 0 | 0 1 0 1 | 0 0 0 0 |
| 2 1 0 1 | 0 0 1 0 | 1 0 0 1 | 0 0 0 0 |
| 0 0 1 0 | 0 0 1 0 | 1 0 0 0 | 0 0 0 0 |
| 1 0 0 1 | 1 0 1 0 | 0 0 0 0 | 0 0 0 0 |

| 0 1 1 1 | 0 1 0 1 | 1 1 1 0 | 0 1 0 0 |
| 0 0 1 0 | 0 1 1 1 | 0 0 0 1 | 0 0 0 0 | ~ 1902
| 1 0 0 1 | 0 0 0 0 | 1 1 0 0 | 1 0 0 0 |
| 0 0 1 0 | 0 0 0 0 | 1 1 0 0 | 0 0 0 0 |

| 0 0 0 0 | 0 0 0 0 | 0 0 0 0 | 0 0 0 0 |
| 0 0 0 0 | 0 0 0 0 | 0 0 0 0 | 0 0 0 0 |
| 0 0 0 0 | 0 0 0 0 | 0 0 0 0 | 0 0 0 0 |
| 0 0 0 0 | 0 0 0 0 | 0 0 0 0 | 0 0 0 0 |

FOR THIS CG CODED_SUB_BLOCK_FLAG IS NOT CODED

*FIG. 19*

| | CTU SIZE | BITRATE | PREDICTION BLOCK SIZE | TU SIZE | AMP (YES 1/ NO 0) | LOOP-FILTER (YES 1/ NO 0) |
|---|---|---|---|---|---|---|
| LEAST DECODING EFFORT (DECODING EFFORT, DE 1) | 32 | BITRATE < CHOSEN THRESHOLD (E.G. THRESHOLDS - 3.5 Mbps FOR 720p30, 8 Mbps FOR 1080p30) | 32x32, 32x64, 64x32, 64x64 | 32x32 | 0 | 0 |
| DE 2 | | | | | | |
| DE 3 | | | 8x16, 16x8, 16x16, 32x16, 16x32 | 16x16, 8x8 | | |
| DE 4 | | | | | | |
| DE 5 | | | | | | 1 |
| DE 6 | 64 | BITRATE > CHOSEN THRESHOLD | | | | |
| DE 7 | | | | | | |
| DE 8 | | | | | | |
| DE 9 | | | 4x8, 8x4, 8x8 | 4x4 | 1 | |
| MAX DECODING EFFORT DE 10 | | | | | | |

FIG. 31

ENCODING VIDEO DATA ACCORDING TO TARGET DECODING DEVICE DECODING COMPLEXITY

BACKGROUND

1. Field of the Invention

The present invention relates to systems and methods for encoding video data, and in particular to a system and method for according to the target decoding device's ability to decode the encoded video stream.

2. Description of the Related Art

The computational capability of mobile clients or target decoding devices (such as tablet computers and smartphones) has tremendously increased. Many of these devices have underlying platforms that include multiple processing cores. It is currently possible to decompress High Efficiency Video Coding (HEVC) video of 720p, 1080p or even 4K video on such mobile clients, provided some constraints are observed on the encoding end. These constraints primarily arise due to the client's processing capacity, battery capacity, display size, network conditions.

It should also be noted that as mobile clients today run a variety of applications, power consumption for each app is an important consideration. Typical video decoding of general purpose video streams typically accounts for high power consumption given the video decoder's computational tasks and frequent accesses to memory, as well as the need to display the decoded frames at the right intensity. Customized streams that are sensitive to and scale with, a decoder's power and/or computational budget are not prevalent, as will be further explained below.

Patent publication WO 2005002233 for "Method of encoding for handheld apparatuses," (hereby incorporated by reference herein) discloses estimating a power consumption of a video processing device, but does not suggest encoding for multicore client devices or those with parallel processing. Instead, advanced video encoders such as HEVC video encoders typically optimize rate distortion (RD) and do not consider the complexity of the decoding process that will be required of the decoder that will decode the encoded stream. General video encoders (such as the HM encoder used for HEVC encoding) may optimize coding efficiency and video quality. They may not consider optimizing of the decoding complexity of the bitstream at the decoder side. Typically, the encoder decisions are made without factoring in the effect of those decisions on the complexity as a decoder (handling that bitstream) sees it. Hence, decoding of specific portions of the encoded bitstream may result in stutters or other manifestations of degradation in the decoding and playback user-experience. Especially in cases of mobile clients, it is desirable that decoding of encoded bitstreams always be limited to the decoding capacity of a decoder.

Further, current encoders do not use parallelization tools such as tiles or wavefront parallel processing (WPP) to take advantage of the multi-core capabilities of target decoding devices. Instead, these parallelization tools are chosen by the encoder without regard to such capabilities.

Current encoders or adaptive streaming servers also do not create versions or streams having multiple variants that correspond to different decoding complexities to account for the different decoding capabilities of the target decoding devices. Further, current video content/streams do not have a scalable and layered approach wherein each layer corresponds to a target decoding-complexity.

Finally, current encoders do not encode streams considering the amount of application or player space buffering done at client to ensure smooth playback for a typical peak/average decoding complexity ratio.

What is needed is a method and apparatus that encode video with consideration given to the decoding complexity to be performed by the target decoding device. The method and apparatus described herein satisfies that need.

SUMMARY

To address the requirements described above, the present invention discloses a method and system for encoding video data according to the complexity of the targeted decoding device. One embodiment is evidenced by a method of encoding video data for decoding on a target decoding device having parallel processing, comprising receiving uncoded video data, computing a relationship between each of a plurality of encoding parameters and target decoding device decoding costs, selecting encoding parameters to minimize encoding costs, wherein the encoding costs include the target decoding device decoding costs, and encoding the uncoded video data according to the selected encoding parameters. Another embodiment is evidenced by an apparatus for encoding video data for decoding on a target decoding device having parallel processing, comprising a processor and an encoder. The processor is communicatively coupled to a memory storing processor instructions, the processor instructions comprising instructions for computing a relationship between each of a plurality of encoding parameters and target decoding device decoding costs, and selecting encoding parameters to minimize encoding costs, wherein the encoding costs include the target decoding device decoding costs. The encoder receives the uncoded video data, and encodes the uncoded video data according to the selected encoding parameters.

BRIEF DESCRIPTION OF THE DRAWINGS

Referring now to the drawings in which like reference numbers represent corresponding parts throughout:

FIG. 19 is a diagram of a 16×16 transform unit (TU) having 4×4 coefficient groups;

FIG. 31 is a diagram illustrating three exemplary complexity categories; and

DETAILED DESCRIPTION

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

This invention envisions that an encoder that generates content for mobile clients encodes video stream in a manner sensitive to decoding complexity. In this context, in addition to optimizing rate-distortion performance, the encoder would also consider the decoding complexity associated with any encoding decision made. Encoding decisions that impact decoding complexity are comprised of motion estimation, intra-mode decisions, inter-mode decisions, appropriate decisions pertaining to deblocking and other in-loop filtering operations. The decoding complexity is related to decoder's motion compensation, entropy coding, generating inter and intra prediction signals, in-loop filtering.

Every choice of an encoding mode or technique used for encoding input video data has a cost (indicative of the decoder complexity). Each encoding decision results in addition to a maintained running sum of decoder complexity costs (along with 'RD' costs). The final value of the sum not only indicates the cost in terms of distortion and rate but also serves as a measure of the total decoding complexity of the encoded data. Encoding modes and methods are altered whenever the total actual cost exceeds the target cost (which in part includes the target decoder complexity).

HEVC Summary

Audio-Visual Information Transception and Storage

Figure 1:
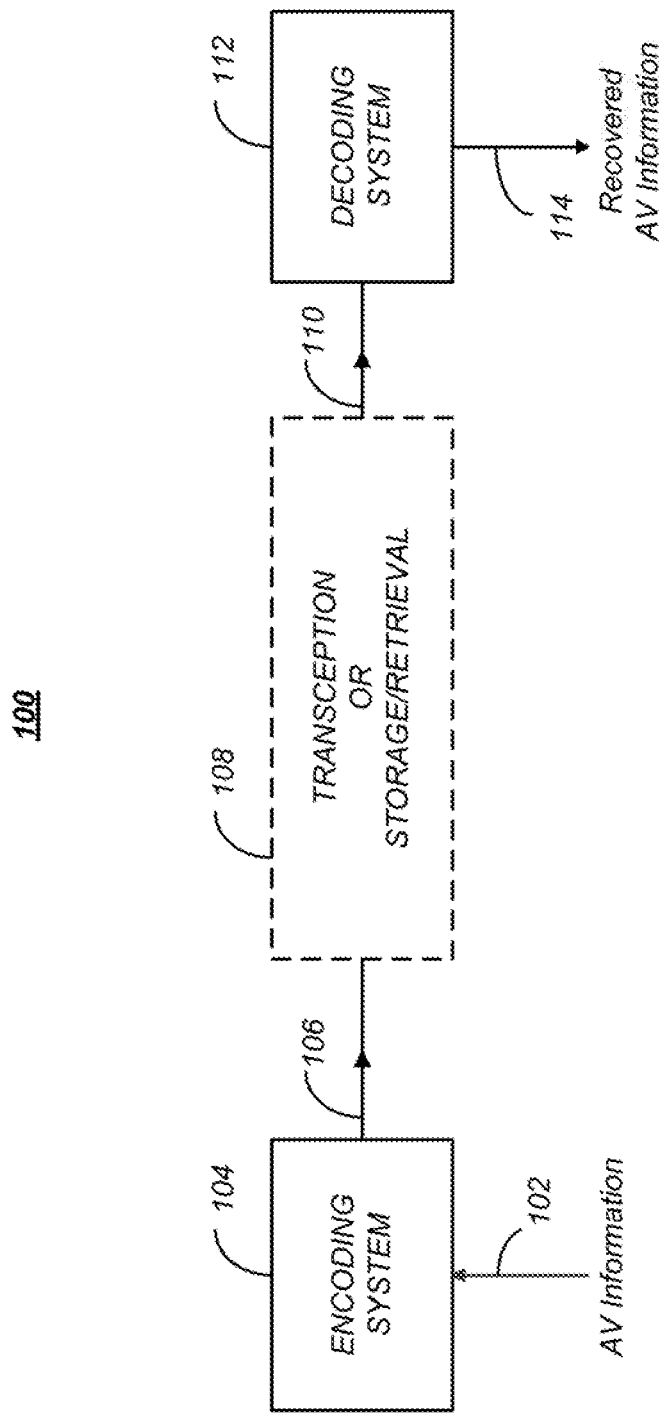
FIG. 1 is a diagram depicting an exemplary embodiment of a video coding-decoding system that can be used for transmission and/or storage and retrieval of audio and/or video information.

FIG. 1 is a diagram depicting an exemplary embodiment of a video coding-decoding (codec) system 100 that can be used for transmission and/or storage and retrieval of audio and/or video information. The codec system 100 comprises an encoding system 104, which accepts audio-visual (AV) information 102 (also referred to hereinafter as uncoded video) and processes the AV information 102 to generate encoded (compressed) AV information 106, and a decoding system 112, which processes the encoded AV information 106 to produce recovered AV information 114. Since the encoding and decoding processes are not lossless, the recovered AV information 114 is not identical to the initial AV information 102, but with judicious selection of the encoding processes and parameters, the differences between the recovered AV information 114 and the unprocessed AV information 102 are acceptable to human perception.

The encoded AV information 106 is typically transmitted or stored and retrieved before decoding and presentation, as performed by transception (transmission and reception) or storage/retrieval system 108. Transception losses may be significant, but storage/retrieval losses are typically minimal or non-existent, hence, the transcepted AV information 110 provided to the decoding system 112 is typically the same as or substantially the same as the encoded AV information 106.

Figure 2A:
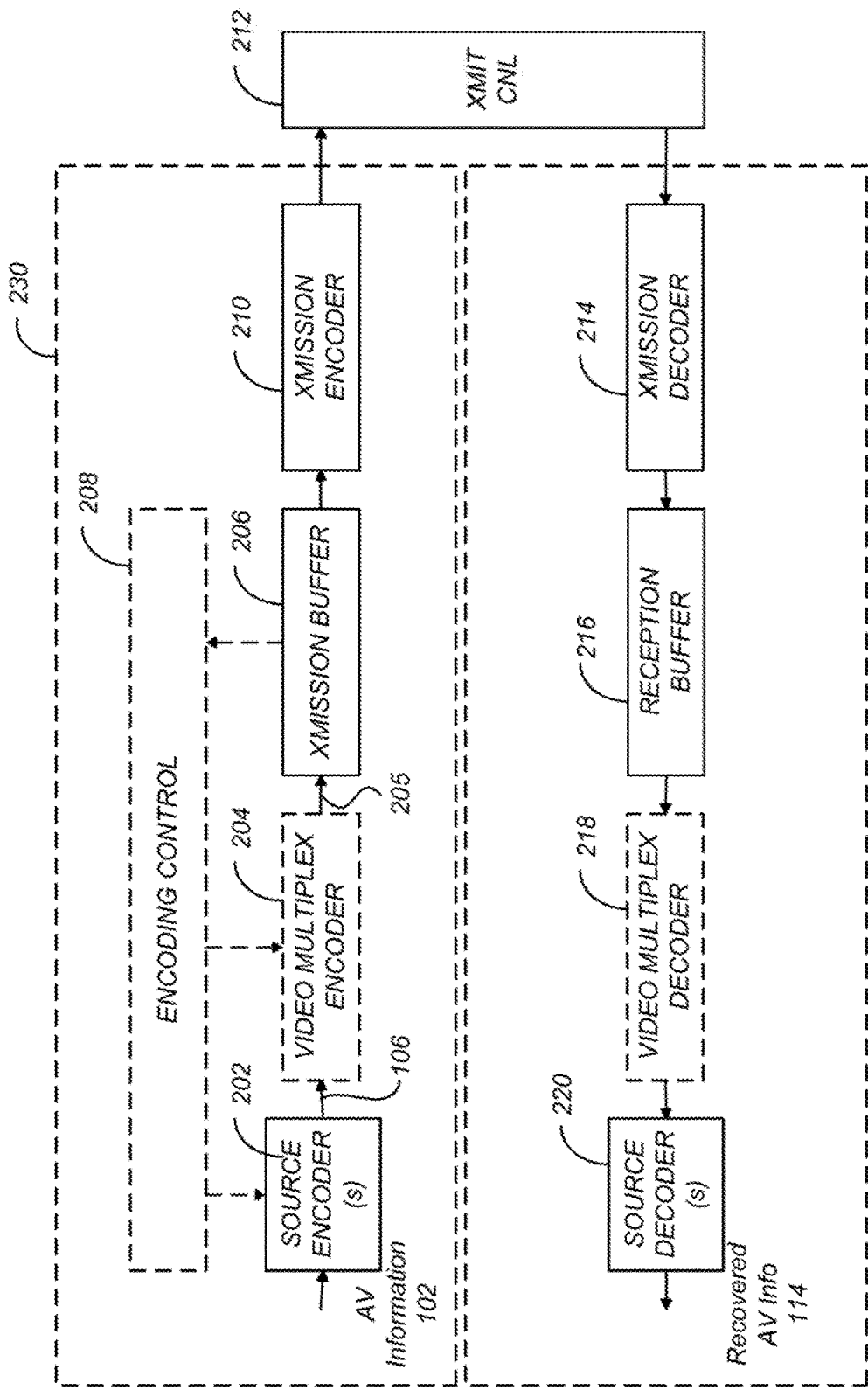
FIG. 2A is a diagram of one embodiment of a codec system in which the encoded AV information is transmitted to and received at another location.

FIG. 2A is a diagram of one embodiment of a codec system 200A in which the encoded AV information 106 is transmitted to and received at another location. A transmission segment 230 converts an input AV information 102 into a signal appropriate for transmission and transmits the converted signal over the transmission channel 212 to the reception segment 232. The reception segment 232 receives the transmitted signal, and converts the received signal into the recovered AV information 114 for presentation. As described above, due to coding and transmission losses and errors, the recovered AV information 114 may be of lower quality than the AV information 102 that was provided to the transmission segment 230. However, error-correcting systems may be included to reduce or eliminate such errors. For example, the encoded AV information 106 may be forward error correction (FEC) encoded by adding redundant information, and such redundant information can be used to identify and eliminate errors in the reception segment 232.

The transmission segment 230 comprises one or more source encoders 202 to encode multiple sources of AV information 102. The source encoder 202 encodes the AV information 102 primarily for purposes of compression to produce the encoded AV information 106, and may include, for example a processor and related memory storing instructions implementing a codec such as MPEG-1, MPEG-2, MPEG-4 AVC/H.264, HEVC or similar codec, as described further below.

The codec system 200A may also include optional elements indicated by the dashed lines in FIG. 2A. These optional elements include a video multiplex encoder 204, an encoding controller 208, and a video demultiplexing decoder 218. The optional video multiplex encoder 204 multiplexes encoded AV information 106 from an associated plurality of source encoder(s) 202 according to one or more parameters supplied by the optional encoding controller 208. Such multiplexing is typically accomplished in the time domain and is data packet based.

In one embodiment, the video multiplex encoder 204 comprises a statistical multiplexer, which combines the encoded AV information 106 from a plurality of source encoders 202 so as to minimize the bandwidth required for transmission. This is possible, since the instantaneous bit rate of the coded AV information 106 from each source encoder 202 can vary greatly with time according to the content of the AV information 102. For example, scenes having a great deal of detail and motion (e.g. sporting events) are typically encoded at higher bitrates than scenes with little motion or detail (e.g. portrait dialog). Since each source encoder 202 may produce information with a high instantaneous bitrate while another source encoder 202 produces information with a low instantaneous bit rate, and since the encoding controller 208 can command the source encoders 202 to encode the AV information 102 according to certain performance parameters that affect the instantaneous bit rate, the signals from each of the source encoders 202 (each having a temporally varying instantaneous bit rate) can be combined together in an optimal way to minimize the instantaneous bit rate of the multiplexed stream 205.

As described above, the source encoder 202 and the video multiplex coder 204 may optionally be controlled by a encoding controller 208 to minimize the instantaneous bit rate of the combined video signal. In one embodiment, this is accomplished using information from a transmission buffer 206 which temporarily stores the coded video signal and can indicate the fullness of the buffer 206. This allows the coding performed at the source encoder 202 or video multiplex coder 204 to be a function of the storage remaining in the transmission buffer 206.

The transmission segment 230 also may comprise a transmission encoder 210, which further encodes the video signal for transmission to the reception segment 232. Transmission encoding may include for example, the aforementioned FEC coding and/or coding into a multiplexing scheme for the transmission medium of choice. For example, if the transmission is by satellite or terrestrial transmitters, the transmission encoder 114 may encode the signal into a signal constellation before transmission via quadrature amplitude modulation (QAM) or similar modulation technique. Also, if the encoded video signal is to be streamed via an Internet protocol device and the Internet, the transmission encodes the signal according to the appropriate protocol. Further, if the encoded signal is to be transmitted via mobile telephony, the appropriate coding protocol is used, as further described below.

The reception segment 232 comprises a transmission decoder 214 to receive the signal that was coded by the transmission coder 210 using a decoding scheme complementary to the coding scheme used in the transmission encoder 214. The decoded received signal may be temporarily stored by optional reception buffer 216, and if the received signal comprises multiple video signals, the received signal is multiplex decoded by video multiplex decoder 218 to extract the video signal of interest from the video signals multiplexed by the video multiplex coder 204. Finally, the video signal of interest is decoded by source decoder 220 (hereinafter also referred to as a target decoding device) using a decoding scheme or codec complementary to the codec used by the source encoder 202 to encode the AV information 102.

In one embodiment, the transmitted data comprises a packetized video stream transmitted from a server (representing the transmitting segment 230) to a client (representing the receiving segment 232). In this case, the transmission encoder 210 may packetize the data and embed network abstract layer (NAL) units in network packets. NAL units define a data container that has header and coded elements, and may correspond to a video frame or other slice of video data.

The compressed data to be transmitted may packetized and transmitted via transmission channel 212, which may include a Wide Area Network (WAN) or a Local Area Network (LAN). Such a network may comprise, for example, a wireless network such as WiFi, an Ethernet network, an Internet network or a mixed network composed of several different networks. Such communication may be affected via a communication protocol, for example Real-time Transport Protocol (RTP), User Datagram Protocol (UDP) or any other type of communication protocol. Different packetization methods may be used for each network abstract layer (NAL) unit of the bitstream. In one case, one NAL unit size is smaller than the maximum transport unit (MTU) size corresponding to the largest packet size that can be transmitted over the network without being fragmented. In this case, the NAL unit is embedded into a single network packet. In another case, multiple entire NAL units are included in a single network packet. In a third case, one NAL unit may be too large to be transmitted in a single network packet and is thus split into several fragmented NAL units with each fragmented NAL unit being transmitted in an individual network packet. Fragmented NAL unit are typically sent consecutively for decoding purposes.

The reception segment 232 receives the packetized data and reconstitutes the NAL units from the network packet. For fragmented NAL units, the client concatenates the data from the fragmented NAL units in order to reconstruct the original NAL unit. The client 232 decodes the received and reconstructed data stream and reproduces the video images on a display device and the audio data by a loud speaker.

Figure 2B:
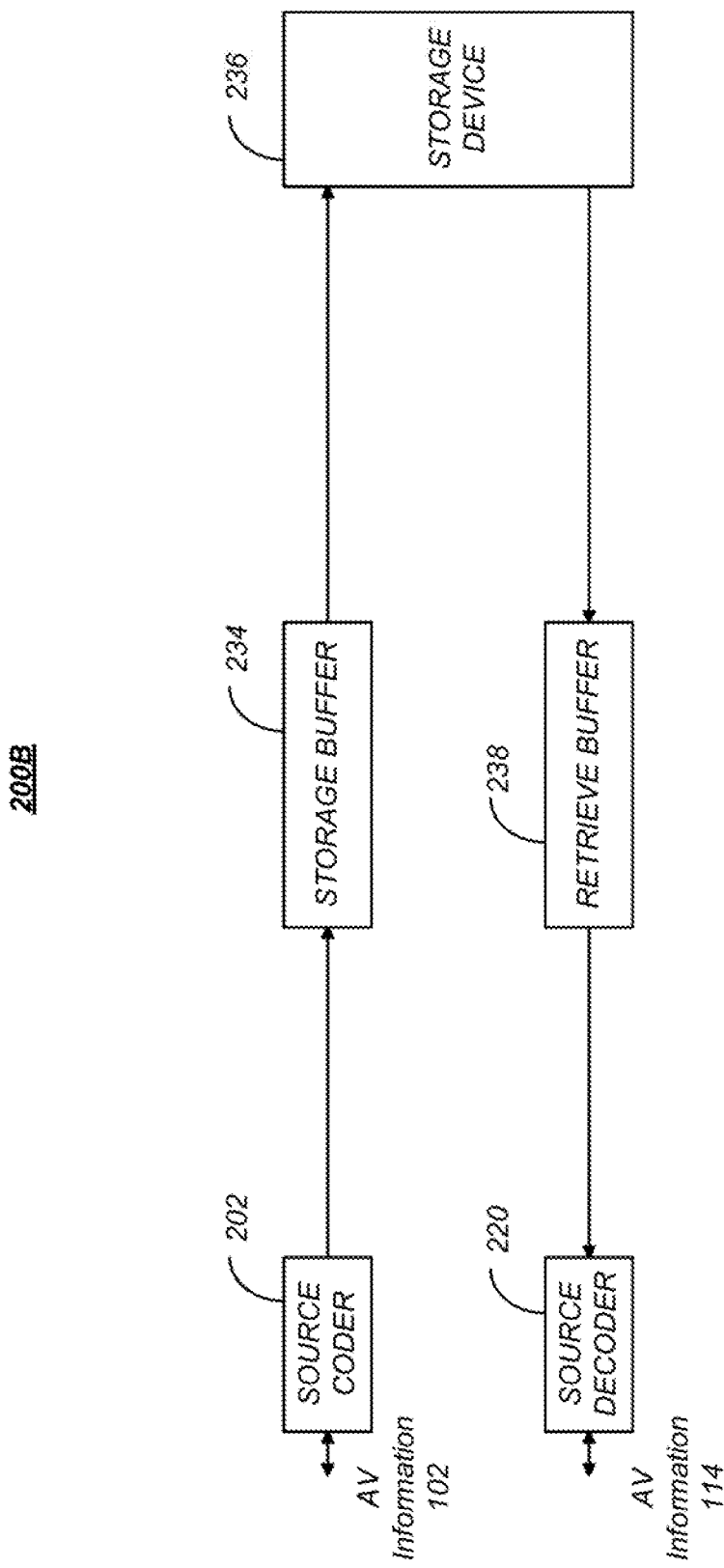
FIG. 2B is a diagram depicting an exemplary embodiment of codec system in which the encoded information is stored and later retrieved for presentation, hereinafter referred to as codec storage system.

FIG. 2B is a diagram depicting an exemplary embodiment of codec system in which the encoded information is stored and later retrieved for presentation, hereinafter referred to as codec storage system 200B. This embodiment may be used, for example, to locally store information in a digital video recorder (DVR), a flash drive, hard drive, or similar device.

In this embodiment, the AV information 102 is source encoded by source encoder 202, optionally buffered by storage buffer 234 before storage in a storage device 236. The storage device 236 may store the video signal temporarily or for an extended period of time, and may comprise a hard drive, flash drive, RAM or ROM. The stored AV information is then retrieved, optionally buffered by retrieve buffer 238 and decoded by the source decoder 220.

Figure 2C:
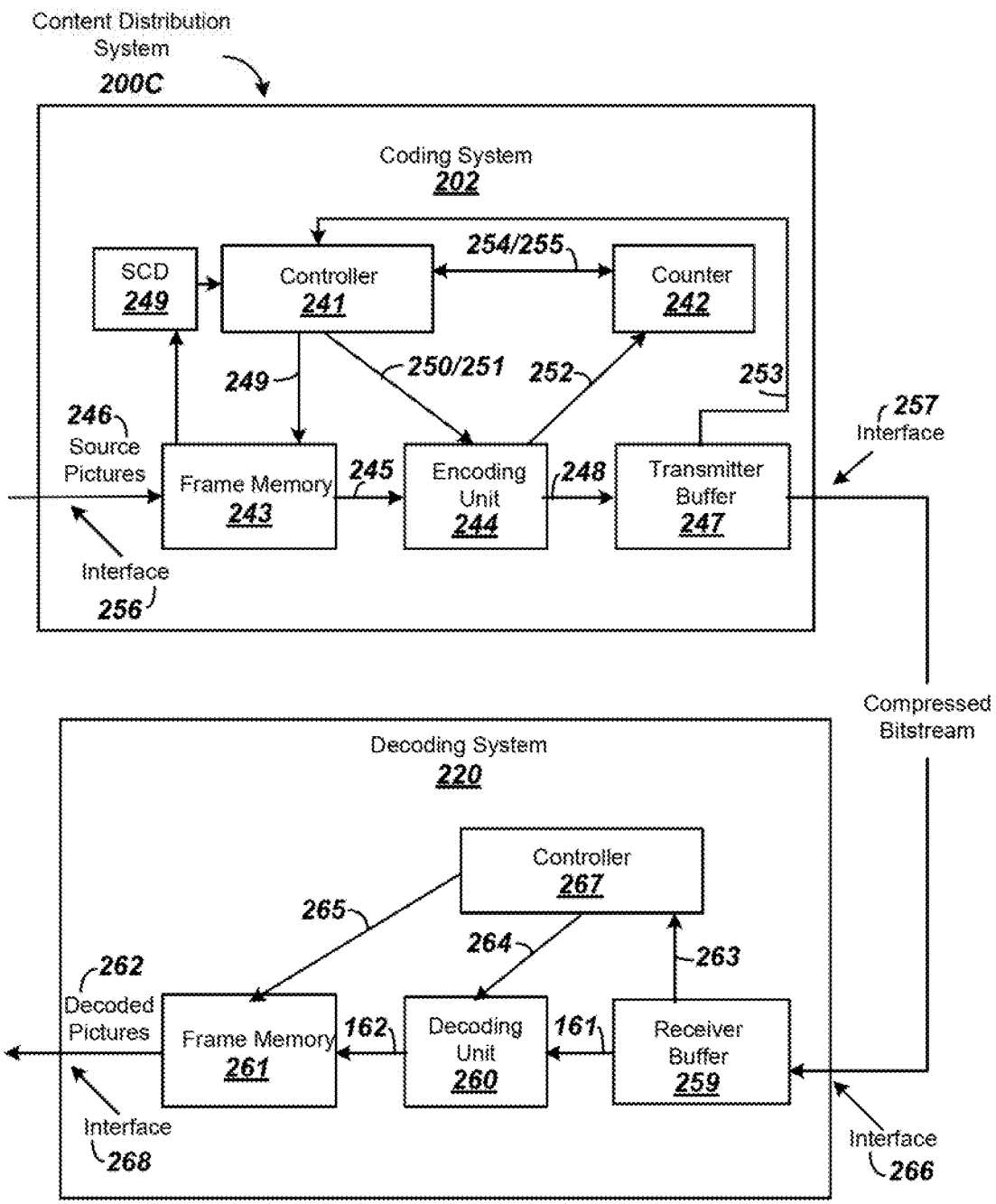
FIG. 2C is another diagram depicting an exemplary content distribution system comprising a coding system or encoder and a decoding system or decoder that can be used to transmit and receive HEVC data.

FIG. 2C is another diagram depicting an exemplary content distribution system 200C comprising a coding system or encoder 202 and a decoding system or decoder 220 that can be used to transmit and receive HEVC data.

In some embodiments, the coding system 202 can comprise an input interface 256, a scene change detector 249, a controller 241 a counter 242 a frame memory 243, an encoding unit 244, a transmitter buffer 247 and an output interface 257.

The decoding system 220 can comprise a receiver buffer 259, a decoding unit 260, a frame memory 261 and a controller 267. The coding system 202 and the decoding system 220 can be coupled with each other via a transmission path which can carry a compressed bit stream. The controller 241 of the coding system 202 can control the amount of data to be transmitted on the basis of the capacity of the transmitter buffer 247 or receiver buffer 259 and can include other parameters such as the amount of data per a unit of time. The controller 241 can control the encoding unit 244 to prevent the occurrence of a failure of a received signal decoding operation of the decoding system 220. The controller 241 can be a processor or include, by way of a non-limiting example, a microcomputer having a processor, a random access memory and a read only memory.

Source pictures 246 supplied from, by way of a non-limiting example, a content provider can include a video sequence of frames including source pictures in a video sequence. The source pictures 246 can be uncompressed or compressed. If the source pictures 246 are uncompressed, the coding system 202 can have an encoding function. If the source pictures 246 are compressed, the coding system 202 can have a transcoding function. Coding units can be derived from the source pictures 246 utilizing the controller 241. The frame memory 243 can have a first area that can be used for storing the incoming frames from the source pictures 246 and a second area that can be used for reading out the frames 245 and outputting them to the encoding unit 244. The controller 241 can output an area switching control signal 249 to the frame memory 243. The area switching control signal 249 can indicate whether the first area or the second area is to be utilized.

The controller 241 can output an encoding control signal 250 to the encoding unit 244. The encoding control signal 250 can cause the encoding unit 244 to start an encoding operation, such as preparing the Coding Units of a source picture. In response to the encoding control signal 250 from the controller 241, the encoding unit 244 can begin to read out the prepared Coding Units to a high-efficiency encoding process, such as a prediction coding process or a transform coding process which process the prepared Coding Units generating video compression data based on the source pictures associated with the Coding Units.

The encoding unit 244 can package the generated video compression data in a packetized elementary stream (PES) including video packets. The encoding unit 244 can map the video packets into an encoded video signal 248 using control information and a program time stamp (PTS) and the encoded video signal 248 can be transmitted to the transmitter buffer 247.

The encoded video signal 248, including the generated video compression data, can be stored in the transmitter buffer 247. The information amount counter 242 can be incremented to indicate the total amount of data in the transmitter buffer 247. As data is retrieved and removed from the buffer, the counter 242 can be decremented to reflect the amount of data in the transmitter buffer 247. The occupied area information signal 253 can be transmitted to the counter 242 to indicate whether data from the encoding unit 244 has been added or removed from the transmitter buffer 247 so the counter 242 can be incremented or decremented. The controller 241 can control the production of video packets produced by the encoding unit 244 on the basis of the occupied area information 253 which can be communicated in order to anticipate, avoid, prevent, and/or detect an overflow or underflow from taking place in the transmitter buffer 247.

The information amount counter 242 can be reset in response to a preset signal 254 generated and output by the controller 241. After the information amount counter 242 is reset, it can count data output by the encoding unit 244 and obtain the amount of video compression data and/or video packets, which have been generated. The information amount counter 242 can supply the controller 241 with an information amount signal 255 representative of the obtained amount of information. The controller 241 can control the encoding unit 244 so that there is no overflow at the transmitter buffer 247.

In some embodiments, the decoding system 220 can comprise an input interface 266, a receiver buffer 259, a controller 267, a frame memory 261, a decoding unit 260 and an output interface 268. The receiver buffer 259 of the decoding system 220 can temporarily store the compressed bit stream, including the received video compression data and video packets based on the source pictures from the source pictures 246. The decoding system 220 can read the control information and presentation time stamp information associated with video packets in the received data and output a frame number signal 263 which can be applied to the controller 267. The controller 267 can supervise the counted number of frames at a predetermined interval. By way of a non-limiting example, the controller 267 can supervise the counted number of frames each time the decoding unit 260 completes a decoding operation.

In some embodiments, when the frame number signal 263 indicates the receiver buffer 259 is at a predetermined capacity, the controller 267 can output a decoding start signal 264 to the decoding unit 260. When the frame number signal 263 indicates the receiver buffer 259 is at less than a predetermined capacity, the controller 267 can wait for the occurrence of a situation in which the counted number of frames becomes equal to the predetermined amount. The controller 267 can output the decoding start signal 264 when the situation occurs. By way of a non-limiting example, the controller 267 can output the decoding start signal 264 when the frame number signal 263 indicates the receiver buffer 259 is at the predetermined capacity. The encoded video packets and video compression data can be decoded in a monotonic order (i.e., increasing or decreasing) based on presentation time stamps associated with the encoded video packets.

In response to the decoding start signal 264, the decoding unit 260 can decode data amounting to one picture associated with a frame and compressed video data associated with the picture associated with video packets from the receiver buffer 259. The decoding unit 260 can write a decoded video signal 269 into the frame memory 261. The frame memory 261 can have a first area into which the decoded video signal is written, and a second area used for reading out decoded pictures 262 to the output interface 268.

In various embodiments, the coding system 202 can be incorporated or otherwise associated with a transcoder or an encoding apparatus at a headend and the decoding system 220 can be incorporated or otherwise associated with a downstream device, such as a mobile device, a set top box or a transcoder.

Source Encoding/Decoding

As described above, the encoders 202 employ compression algorithms to generate bit streams and/or files of smaller size than the original video sequences in the AV information 102. Such compression is made possible by reducing spatial and temporal redundancies in the original sequences.

Encoders 202 include those compliant with the video compression standard H.264/MPEG-4 AVC ("Advanced Video Coding") developed by between the "Video Coding Expert Group" (VCEG) of the ITU and the "Moving Picture Experts Group" (MPEG) of the ISO, in particular in the form of the publication "Advanced Video Coding for Generic Audiovisual Services" (March 2005), which is hereby incorporated by reference herein.

HEVC "High Efficiency Video Coding" (sometimes known as H.265) is expected to replace the H.264/MPEG-4 AVC. HEVC introduces new coding tools and entities that are generalizations of the coding entities defined in H.264/AVC, as further described below.

Figure 3:
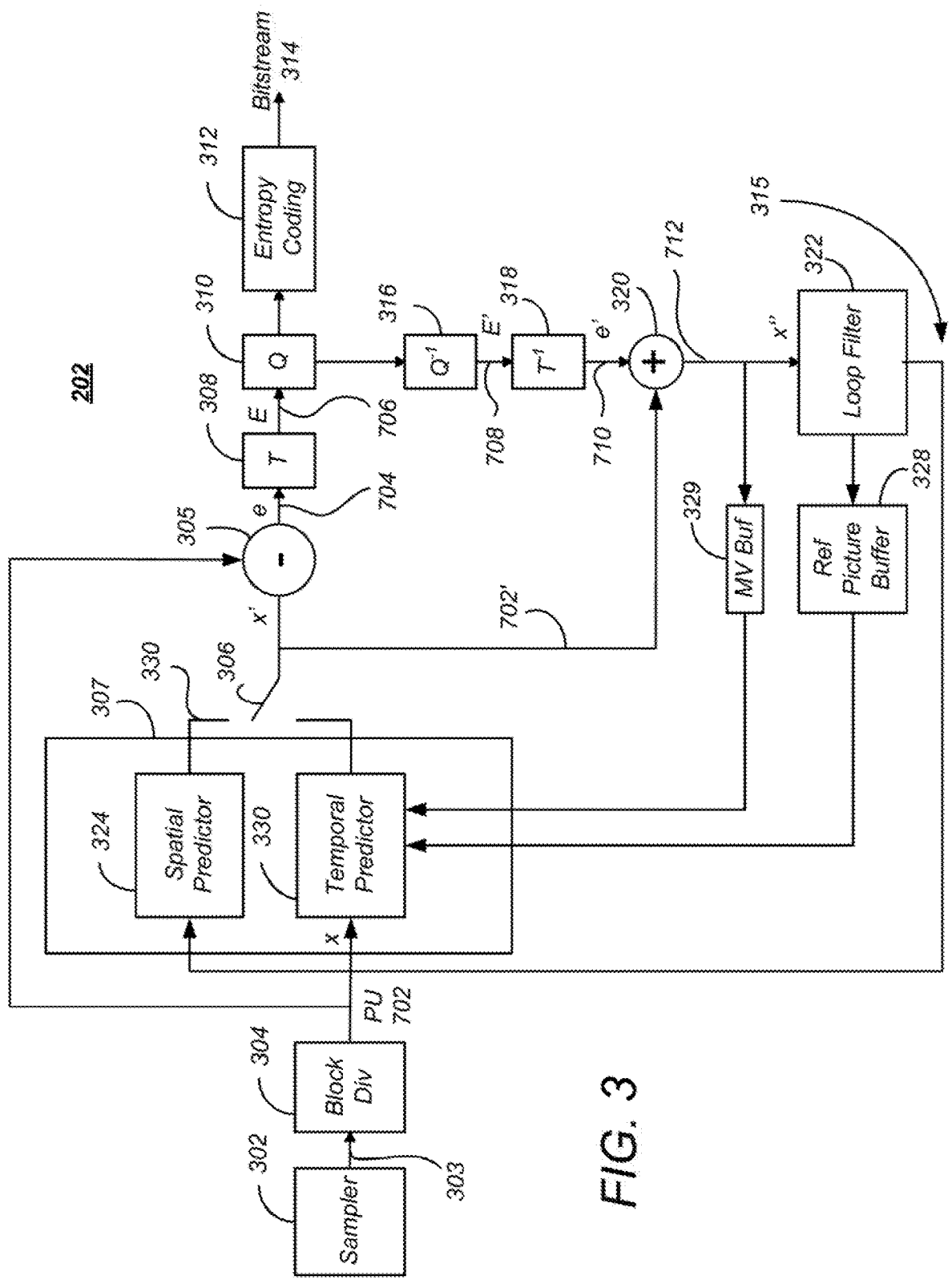
FIG. 3 is a block diagram illustrating one embodiment of the source encoder.

FIG. 3 is a block diagram illustrating one embodiment of the source encoder 202. The source encoder 202 accepts AV information 102 and uses sampler 302 to sample the AV information 102 to produce a sequence 303 of successive of digital images or pictures, each having a plurality of pixels. A picture can comprise a frame or a field, wherein a frame is a complete image captured during a known time interval, and a field is the set of odd-numbered or even-numbered scanning lines composing a partial image.

The sampler 302 produces an uncompressed picture sequence 303. Each digital picture can be represented by one or more matrices having a plurality of coefficients that represent information about the pixels that together comprise the picture. The value of a pixel can correspond to luminance or other information. In the case where several components are associated with each pixel (for example red-green-blue components or luminance-chrominance components), each of these components may be separately processed.

Images can be segmented into "slices," which may comprise a portion of the picture or may comprise the entire picture. In the H.264 standard, these slices are divided into coding entities called macroblocks (generally blocks of size 16 pixels×16 pixels) and each macroblock may in turn be divided into different sizes of data blocks, for example 4×4, 4×8, 8×4, 8×8, 8×16, 16×8. HEVC expands and generalizes the notion of the coding entity beyond that of the macroblock.

HEVC Coding Entities: CTU, CU, PU and TU

Like other video coding standards, HEVC is a block-based hybrid spatial and temporal predictive coding scheme. However, HEVC introduces new coding entities that are not included with H.264/AVC standard. These coding entities include (1) Coding tree block (CTUs), coding units (CUs), the predictive units (PUs) and transform units (TUs) and are further described below.

Figure 4:
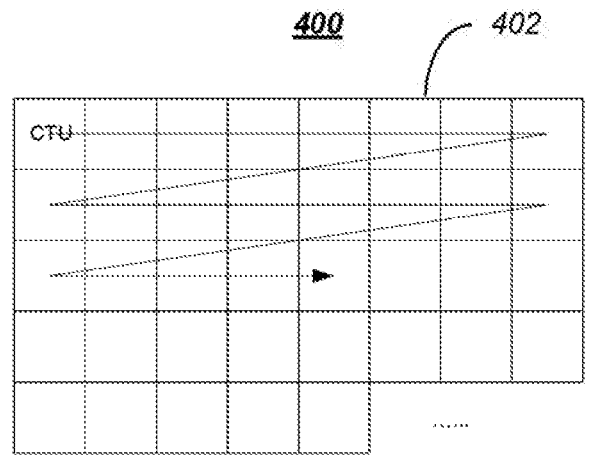
FIG. 4 is a diagram depicting a picture of AV information, such as one of the pictures in the picture sequence.

FIG. 4 is a diagram depicting a picture 400 of AV information 102, such as one of the pictures in the picture sequence 303. The picture 400 is spatially divided into non-overlapping square blocks known as coding tree units(s), or CTUs 402. Unlike H.264 and previous video coding standards where the basic coding unit is macroblock of 16×16 pixels, the CTU 402 is the basic coding unit of HEVC, and can be as large as 128×128 pixels. As shown in FIG. 4, the CTUs 402 are typically referenced within the picture 400 in an order analogous to a progressive scan.

Each CTU 402 may in turn be iteratively divided into smaller variable size coding units described by a "quadtree" decomposition further described below. Coding units are regions formed in the image to which similar encoding parameters are applied and transmitted in the bitstream 314.

Figure 5:
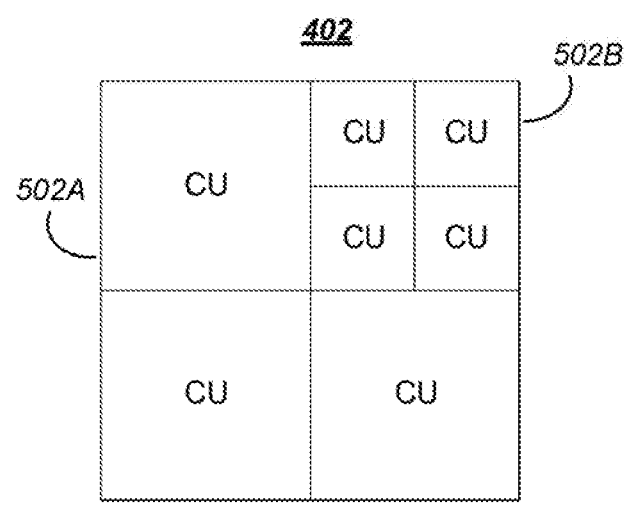
FIG. 5 is a diagram showing an exemplary partition of a coding tree block into coding units.

FIG. 5 is a diagram showing an exemplary partition of a CTU 402 into coding units (CUs) such as coding unit 502A and 502B (hereinafter alternatively referred to as coding unit(s) 502). A single CTU 402 can be divided into four CUs 502 such as CU 502A, each a quarter of the size of CTU 402. Each such divided CU 502A can be further divided into four smaller CUs 502B of quarter size of initial CU 502A.

The division of CTUs 402 into CUs 502A and into smaller CUs 502B is described by "quadtree" data parameters (e.g. flags or bits) that are encoded into the output bitstream 314 along with the encoded data as overhead known as syntax.

Figure 6:
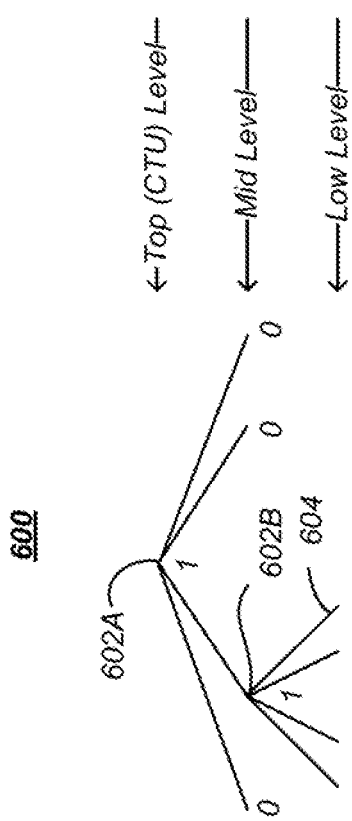
FIG. 6 is a diagram illustrating a representation of a representative quadtree and data parameters for the code tree block partitioning shown in FIG. 5.

FIG. 6 is a diagram illustrating a representation of a representative quadtree 600 and data parameters for the CTU 402 partitioning shown in FIG. 5. The quadtree 600 comprises a plurality of nodes including first node 602A at one hierarchical level and second node 602B at a lower hierarchical level (hereinafter, quadtree nodes may be alternatively referred to as "nodes" 602). At each node 602 of a quadtree, a "split flag" or bit "1" is assigned if the node 602 is further split into sub-nodes, otherwise a bit "0" is assigned.

For example, the CTU 402 partition illustrated in FIG. 5 can be represented by the quadtree 600 presented in FIG. 6, which includes a split flag of "1" associated with node 602A at the top CU 502 level (indicating there are 4 additional nodes at a lower hierarchical level). The illustrated quadtree 600 also includes a split flag of "1" associated with node 602B at the mid CU 502 level to indicate that this CU is also partitioned into four further CUs 502 at the next (bottom) CU level. The source encoder 202 may restrict the minimum and maximum CU 502 sizes, thus changing the maximum possible depth of the CU 502 splitting.

The source encoder 202 generates encoded AV information 106 in the form of a bitstream 314 that includes a first portion having encoded data for the CUs 502 and a second portion that includes overhead known as syntax elements. The encoded data includes data corresponding to the encoded CUs 502 (i.e. the encoded residuals together with their associated motion vectors, predictors, or related residuals as described further below). The second portion includes syntax elements that may represent encoding parameters which do not directly correspond to the encoded data of the blocks. For example, the syntax elements may comprise an address and identification of the CU 502 in the image, a quantization parameter, an indication of the elected Inter/Intra coding mode, the quadtree 600 or other information.

CUs 502 correspond to elementary coding elements and include two related sub-units: prediction units (PUs) and transform units (TUs), both of which have a maximum size equal to the size of the corresponding CU 502.

Figure 7:
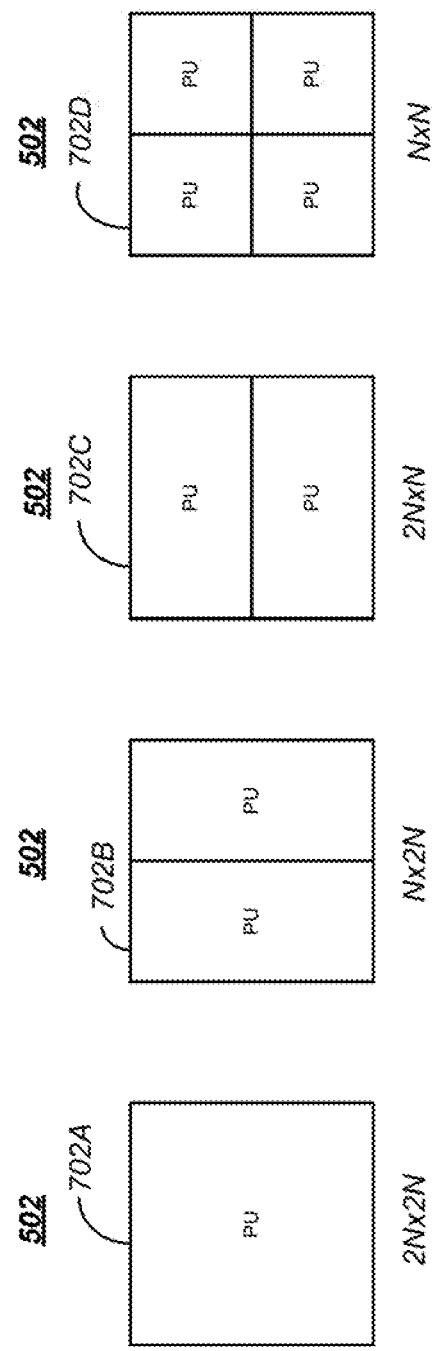
FIG. 7 is a diagram illustrating the partition of a coding unit into one or more prediction units.

FIG. 7 is a diagram illustrating the partition of a CU 502 into one or more PUs 702. A PU 702 corresponds to a partitioned CU 502 and is used to predict pixels values for intra-picture or inter-picture types. PUs 702 are an extension of the partitioning of H.264/AVC for motion estimation, and are defined for each CU 502 that is not further subdivided into other CUs ("split flag"=0). At each leaf 604 of the quadtree 600, a final (bottom level) CU 502 of 2N×2N can possess one of four possible patterns of PUs: 2N×2N (702A), 2N×N (702B), N×2N (702C) and N×N (702D), as shown in FIG. 7, as well as certain other asymmetric motion partitions (AMP) defined in the HEVC specification.

A CU 502 can be either spatially or temporally predictive coded. If a CU 502 is coded in "intra" mode, each PU 702 of the CU 502 can have its own spatial prediction direction and image information as further described below. Also, in the "intra" mode, the PU 702 of the CU 502 may depend on another CU 502 because it may use a spatial neighbor, which is in another CU. If a CU 502 is coded in "inter" mode, each PU 702 of the CU 502 can have its own motion vector(s) and associated reference picture(s) as further described below.

Figure 8:
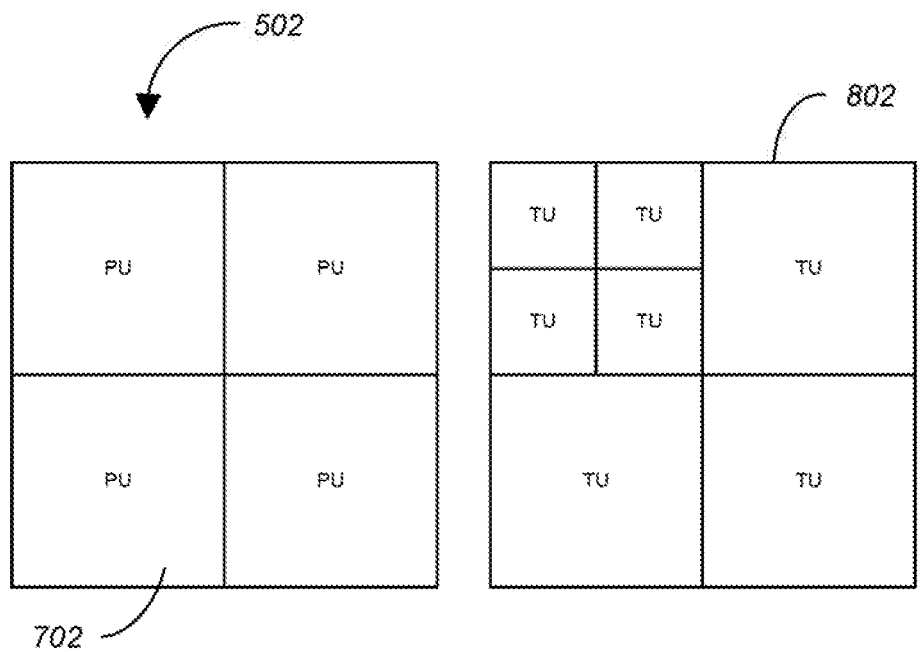
FIG. 8 is a diagram showing a coding unit partitioned into four prediction units and an associated set of transform units.

FIG. 8 is a diagram showing a CU 502 partitioned into four PUs 702 and an associated set of transform units (TUs) 802. TUs 802 are used to represent the elementary units that are spatially transformed by a DCT (Discrete Cosine Transform). The size and location of each block transform TU 802 within a CU 502 is described by a "residual" quadtree (RQT) further illustrated below.

Figure 9:
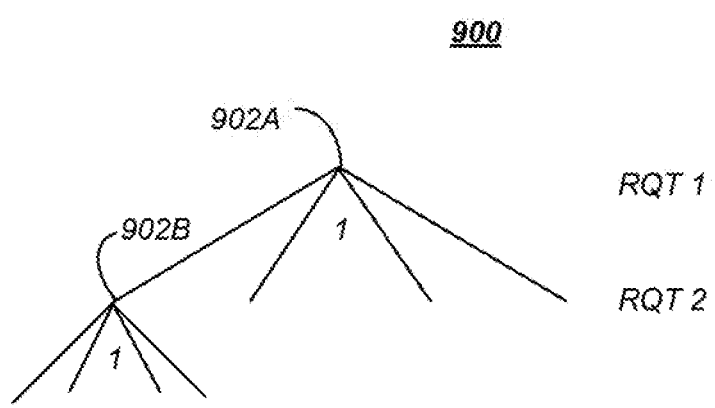
FIG. 9 is a diagram showing a residual quad tree (RQT) for the transform units associated with the coding unit in the example of FIG. 8.

FIG. 9 is a diagram showing RQT 900 for TUs 802 for the CU 502 in the example of FIG. 8. Note that the "1" at the first node 902A of the RQT 900 indicates that there are four branches and that the "1" at the second node 902B at the adjacent lower hierarchical level indicates that the indicated node further has four branches. The data describing the RQT 900 is also coded and transmitted as an overhead in the bitstream 314.

The coding parameters of a video sequence may be stored in dedicated NAL units called parameter sets. Two types of parameter sets NAL units may be employed. The first parameter set type is known as a Sequence Parameter Set (SPS), and comprises a NAL unit that includes parameters that are unchanged during the entire video sequence. Typically, an SPS handles the coding profile, the size of the video frames and other parameters. The second type of parameter set is known as a Picture Parameter Set (PPS), and codes different values that may change from one image to another.

Spatial and Temporal Prediction

One of the techniques used to compress a bitstream 314 is to forego the storage of pixel values themselves and instead, predict the pixel values using a process that can be repeated at the decoder 220 and store or transmit the difference between the predicted pixel values and the actual pixel values (known as the residual). So long as the decoder 220 can compute the same predicted pixel values from the information provided, the actual picture values can be recovered by adding the residuals to the predicted values. The same technique can be used to compress other data as well.

Referring back to FIG. 3, each PU 702 of the CU 502 being processed is provided to a predictor module 307. The predictor module 307 predicts the values of the PUs 702 based on information in nearby PUs 702 in the same frame (intra-frame prediction, which is performed by the spatial predictor 324) and information of PUs 702 in temporally proximate frames (inter-frame prediction, which is performed by the temporal predictor 330). Temporal prediction, however, may not always be based on a collocated PU, since collocated PUs are defined to be located at a reference/non-reference frame having the same x and y coordinates as the current PU 702. These techniques take advantage of spatial and temporal dependencies between PUs 702.

Encoded units can therefore be categorized to include two types: (1) non-temporally predicted units and (2) temporally predicted units. Non-temporally predicted units are predicted using the current frame, including adjacent or nearby PUs 702 within the frame (e.g. intra-frame prediction), and are generated by the spatial predictor 324. Temporally predicted units are predicted from one temporal picture (e.g. P-frames) or predicted from at least two reference pictures temporally ahead and/or behind (i.e. B-frames).

Spatial Prediction

Figure 10:
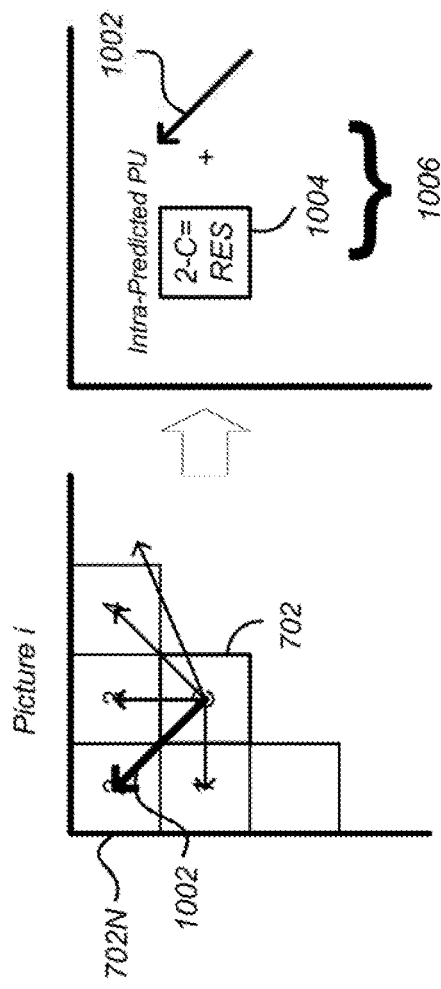
FIG. 10 is a diagram illustrating spatial prediction of prediction units.

FIG. 10 is a diagram illustrating spatial prediction of PUs 702. A picture may comprise a PU 702 and spatially proximate other PUs 1-4, including nearby PU 702N. The spatial predictor 324 predicts the current block (e.g. block C of FIG. 10) by means of an "intra-frame" prediction which uses PUs 702 of already-encoded other blocks of pixels of the current image.

The spatial predictor 324 locates a nearby PU (e.g. PU 1, 2, 3 or 4 of FIG. 10) that is appropriate for spatial coding and determines an angular prediction direction to that nearby PU. In HEVC, 35 directions can be considered, so each PU may have one of 35 directions associated with it, including horizontal, vertical, 45 degree diagonal, 135 degree diagonal, DC etc. The spatial prediction direction of the PU is indicated in the syntax.

Referring back to the spatial predictor 324 of FIG. 3, this located nearby PU is used to compute a residual PU 704 (*e*) as the difference between the pixels of the nearby PU 702N and the current PU 702, using element 305. The result is an intra-predicted PU element 1006 that comprises a prediction direction 1002 and the intra-predicted residual PU 1004. The prediction direction 1002 may be coded by inferring the direction from spatially proximate PUs, and the spatial dependencies of the picture, enabling the coding rate of the intra prediction direction mode to be reduced.

Temporal Prediction

Figure 11:
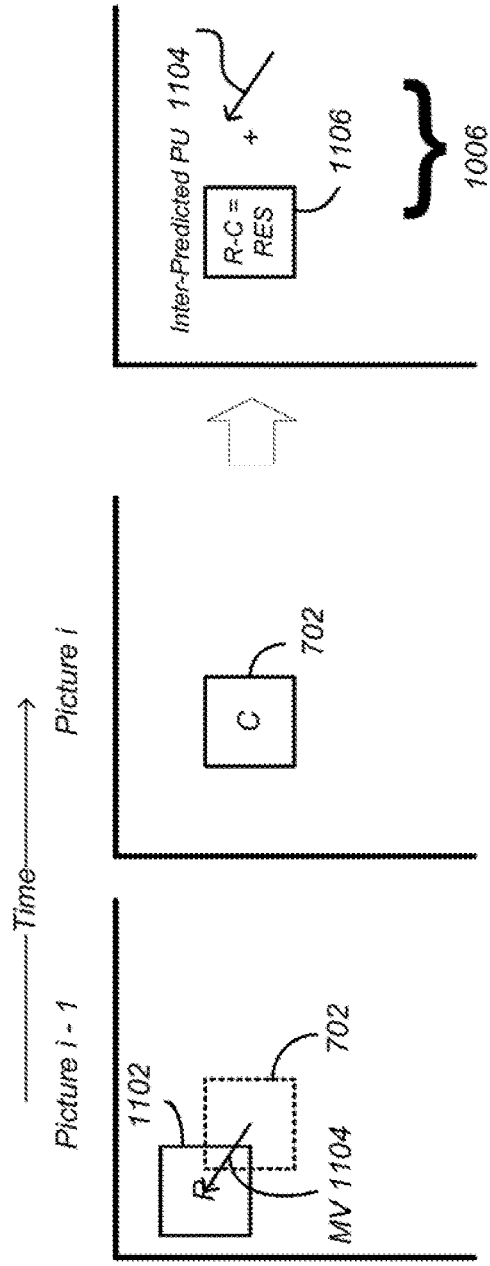
FIG. 11 is a diagram illustrating temporal prediction.

FIG. 11 is a diagram illustrating temporal prediction. Temporal prediction considers information from temporally neighboring pictures or frames, such as the previous picture, picture i−1.

Generally, temporal prediction includes single-prediction (P-type), which predicts the PU 702 by referring to one reference area from only one reference picture, and multiple prediction (B-type), which predicts the PU by referring to two reference areas from one or two reference pictures. Reference images are images in the video sequence that have already been coded and then reconstructed (by decoding).

The temporal predictor 330 identifies, in one or several of these reference areas (one for P-type or several for B-type), areas of pixels in a temporally nearby frame so that they can be used as predictors of this current PU 702. In the case where several areas predictors are used (B-type), they may be merged to generate one single prediction. The reference area 1102 is identified in the reference frame by a motion vector (MV) 1104 that defines the displacement between the current PU 702 in current frame (picture i) and the reference area 1102 (refldx) in the reference frame (picture i−1). A PU in a B-picture may have up to two MVs. Both MV and refldx information are included in the syntax of the HEVC bitstream.

Referring again to FIG. 3, a difference between the pixel values between of the reference area 1102 and the current PU 702 may be computed by element 305 as selected by switch 306. This difference is referred to as the residual of the inter-predicted PU 1006. At the end of the temporal or inter-frame prediction process, the current PU 1006 is composed of one motion vector MV 1104 and a residual 1106.

However, as described above, one technique for compressing data is to generate predicted values for the data using means repeatable by the decoder 220, computing the difference between the predicted and actual values of the data (the residual) and transmitting the residual for decoding. So long as the decoder 220 can reproduce the predicted values, the residual values can be used to determine the actual values.

This technique can be applied to the MVs 1104 used in temporal prediction by generating a prediction of the MV 1104, computing a difference between the actual MV 1104 and the predicted MV 1104 (a residual) and transmitting the MV residual in the bitstream 314. So long as the decoder 220 can reproduce the predicted MV 1104, the actual MV 1104 can be computed from the residual. HEVC computes a predicted MV for each PU 702 using the spatial correlation of movement between nearby PUs 702.

Figure 12:
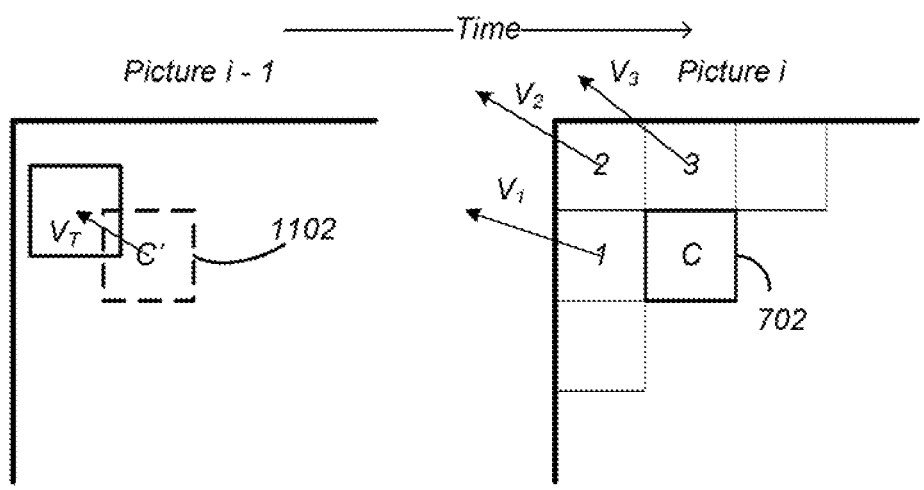
FIG. 12 is a diagram illustrating the use of motion vector predictors (MVPs)

FIG. 12 is a diagram illustrating the use of motion vector predictors (MVPs) in HEVC. Motion vector predictors $V_1$, $V_2$ and $V_3$ are taken from the MVs 1104 of a plurality of blocks 1, 2, and 3 situated nearby or adjacent the block to encode (C). As these vectors refer to motion vectors of spatially neighboring blocks within the same temporal frame and can be used to predict the motion vector of the block to encode, these vectors are known as spatial motion predictors.

FIG. 12 also illustrates temporal motion vector predictor $V_T$ which is the motion vector of the co-located block C' in a previously decoded picture (in decoding order) of the sequence (e.g. block of picture i−1 located at the same spatial position as the block being coded (block C of image i).

The components of the spatial motion vector predictors $V_1$, $V_2$ and $V_3$ and the temporal motion vector predictor $V_T$ can be used to generate a median motion vector predictor $V_M$. In HEVC, the three spatial motion vector predictors may be taken as shown in FIG. 12, that is, from the block situated to the left of the block to encode ($V_1$), the block situated above ($V_3$) and from one of the blocks situated at the respective corners of the block to encode ($V_2$), according to a predetermined rule of availability. This MV predictor selection technique is known as Advanced Motion Vector Prediction (AMVP).

A plurality of (typically five) MV predictor (MVP) candidates having spatial predictors (e.g. $V_1$, $V_2$ and $V_3$) and temporal predictor(s) $V_T$ is therefore obtained. In order to reduce the overhead of signaling the motion vector predictor in the bitstream, the set of motion vector predictors may reduced by eliminating data for duplicated motion vectors (for example, MVs which have the same value as other MVs may be eliminated from the candidates).

The encoder 202 may select a "best" motion vector predictor from among the candidates, and compute a motion vector predictor residual as a difference between the selected motion vector predictor and the actual motion vector, and transmit the motion vector predictor residual in the bitstream 314. To perform this operation, the actual motion vector must be stored for later use by the decoder 220 (although it is not transmitted in the bit stream 314. Signaling bits or flags are included in the bitstream 314 to specify which MV residual was computed from the normalized motion vector predictor, and are later used by the decoder to recover the motion vector. These bits or flags are further described below.

The intra-predicted residuals 1004 and the inter-predicted residuals 1106 obtained from the spatial (intra) or temporal (inter) prediction process are then transformed by transform module 308 (depicted in FIG. 3) into the transform units (TUs) 802 described above. A TU 802 can be further split into smaller TUs using the RQT decomposition described above with respect to FIG. 9. In HEVC, generally 2 or 3 levels of decompositions are used and authorized transform sizes are from 32×32, 16×16, 8×8 and 4×4. As described above, the transform is derived according to a discrete cosine transform (DCT) or discrete sine transform (DST).

The residual transformed coefficients are then quantized by quantizer 310. Quantization plays a very important role in data compression. In HEVC, quantization converts the high precision transform coefficients into a finite number of possible values. Although the quantization permits a great deal of compression, quantization is a lossy operation, and the loss by quantization cannot be recovered.

The coefficients of the quantized transformed residual are then coded by means of an entropy coder 312 and then inserted into the compressed bit stream 3140 as a part of the useful data coding the images of the AV information. Coding syntax elements may also be coded using spatial dependencies between syntax elements to increase the coding efficiency. HEVC offers entropy coding such as context-adaptive binary arithmetic coding (CABAC). Other forms or entropy or arithmetic coding may also be used.

In order to calculate the predictors used above, the encoder 202 decodes already encoded PUs 702 using "decoding" loop 315, which includes elements 316, 318, 320, 322, 328. This decoding loop 315 reconstructs the PUs and images from the quantized transformed residuals.

The quantized transform residual coefficients E are provided to dequantizer 316, which applies the inverse operation to that of quantizer 310 to produce dequantized transform coefficients of the residual PU (E') 708. The dequantized data 708 is then provided to inverse transformer 318 which applies the inverse of the transform applied by the transform module 308 to generate reconstructed residual coefficients of the PU (e') 710.

The reconstructed coefficients of the residual PU 710 are then added to the corresponding coefficients of the corresponding predicted PU (x') 702' selected from the intra-predicted PU 1004 and the inter-predicted PU 1106 by selector 306. For example, if the reconstructed residual comes from the "intra" coding process of the spatial predictor 324, the "intra" predictor (x') is added to this residual in order to recover a reconstructed PU (x") 712 corresponding to the original PU 702 modified by the losses resulting from a transformation, for example in this case the quantization operations. If the residual 710 comes from an "inter" coding process of the temporal predictor 330, the areas pointed to by the current motion vectors (these areas belong to the reference images stored in reference buffer 328 referred by the current image indices) are merged then added to this decoded residual. In this way the original PU 702 is modified by the losses resulting from the quantization operations.

To the extent that the encoder 202 uses motion vector prediction techniques analogous to the image prediction techniques described above, the motion vector may be stored using motion vector buffer 329 for use in temporally subsequent frames. As further described below, a flag may be set and transferred in the syntax to indicate that the motion vector for the currently decoded frame should be used for at least the subsequently coded frame instead of replacing the contents of the MV buffer 329 with the MV for the current frame.

A loop filter 322 is applied to the reconstructed signal (x") 712 in order to reduce the effects created by heavy quantization of the residuals obtained, and to improve the signal quality. The loop filter 322 may comprise, for example, a deblocking filter for smoothing borders between PUs to visually attenuate high frequencies created by the coding process and a linear filter that is applied after all of the PUs for an image have been decoded to minimize the sum of the square difference (SSD) with the original image. The linear filtering process is performed on a frame by frame basis and uses several pixels around the pixel to be filtered, and also uses spatial dependencies between pixels of the frame. The linear filter coefficients may be coded and transmitted in one header of the bitstream, typically a picture or slice header.

The filtered images, also known as reconstructed images, are then stored as reference images from reference image buffer 328 in order to allow the subsequent "Inter" predictions taking place during the compression of the subsequent images of the current video sequence.

HEVC Modules Contributing to Decoding Complexity

As described above, HEVC induces a variable-size block tree-partitioning on each frame by using (luma and chroma) coding tree blocks (CTB), which can be used directly as coding blocks (CB), or can be partitioned into multiple CBs. The prediction, for luma and associated chroma CBs of an area of frame, can use intra-picture or inter-picture prediction. Based on this basic prediction-type decision, luma and chroma CBs can further be split into luma and chroma prediction blocks (PBs). After prediction, the residual coding is performed after a CB is recursively partitioned into transform blocks (TBs)

Intrapicture Prediction:

As described in more detail above, HEVC uses DC, planar and 33 angular prediction modes for performing intra (within the picture) prediction. Samples are predicted from reconstructed samples of neighboring blocks. The PB sizes used can range from 4×4 to 64×64. From a decoder perspective, intra-prediction operates on a TB size at a time, and previously decoded boundary samples from spatially neighboring TBs are used to form the prediction signal.

Interpicture Prediction:

The inter (between temporally nearby) coded blocks may use any of a number of partition modes. Motion compensation is typically applied to reconstruct the inter coded blocks. The decoder performs motion compensation by first fetching reference data, applying padding if reference block is outside picture boundaries, and subsequently using the motion vectors, signaled modes and the reference data to construct the predictor. For fractional motion vectors, interpolation is applied. Depending on the precision of the motion vectors (e.g., up to a quarter pixel in HEVC), linear filters may be applied to obtain pixel values at fractional positions. In HEVC, the interpolation filters may have seven or eight taps for luma and four taps for chroma. HEVC reduces the number of bits require to carry the motion data by employing effective motion vector prediction (MVP) signaling under two types—a merge mode (involving complete inheritance of motion data), and an Advanced Motion Prediction mode (involving inference of motion vectors using predictors and signaled motion vector differences). Several candidates compete for the prediction, out of which a best candidate is determined. The best candidate is used as the MVP.

Inverse Transform, Scaling and Quantization:

The processes of scaling and dequantization, followed by inverse transforms, use the frequency domain quantized transformed coefficients. These coefficients are duly converted to the spatial domain residuals for the constituent blocks under these processes. The prediction error residual is signaled in HEVC in a quantized transform-coded manner. The residual block is partitioned into multiple square TBs, the possible TB sizes being 4×4, 8×8, 16×16, and 32×32. The transform data is typically quantized as per a quantization parameter Qp, which ranges from 0 to 51. Quantization matrices of sizes 4×4 and 8×8 are used. An 8×8 scaling matrix is sent for the 16×16 and 32×32 transform sizes, which is applied in a specific way by sharing of values within 2×2 and 4×4 groups of coefficients, along with signaling of value at the DC position.

Entropy Decoding:

In an HEVC decoder, the entropy decoder first converts the bits of coded bit-stream into bins, which are the binarized form of the coded symbols. The entropy decoder uses appropriate context models (indexed appropriately using a context index) that are associated with a probability distribution to each given bin. The de-binarization step in entropy decoding converts the bins to the transmitted symbol value. The symbol values are used for the remaining processes involved in the video decoding since they convey information such as intra-prediction mode, quantized transform coefficients, motion vectors and indexes into reference pictures list(s).

In-Loop Filtering:

Specific deblocking filter operations are applied at the transform and/or prediction block boundaries, depending on a number of factors, e.g., presence of intra-coded block, presence of non-zero coefficients, reference indices and motion vectors of the constituent blocks. The deblocking filter in HEVC may be content-based. Sample adaptive offset filtering to reduce other compression noise is also performed.

Parallelization Using Tiles:

One of the tools introduced in HEVC that aims to support parallelism is the Tile structure. Tiling allows the partitioning of video frame in square and rectangular shapes. Both the size and shape of tiles can be freely defined by controlling the number of row and column partitions. Tiles are considered independent since coding and prediction dependencies such as motion vector prediction, intra prediction, entropy coding and context selection, are broken through its boundaries. In HEVC, for the encoder and decoder to know where each tile is located into the frame/bitstream (for reconstruction of the complete picture), the Standard provides a mechanism of insertion of markers in the bitstream to indicate the tiles entry points. Alternatively, the tile offsets can be signaled in the slice header.

Parallelization Using WPP:

Under wavefront parallel processing (WPP), a slice is divided into rows of CTUs and WPP supports parallel processing of rows of CTUs by using multiple processing threads in the decoder. WPP offers parallelism within a slice.

WPP could provide better compression performance than tiles, and avoid some visual artifacts that may be induced by using tiles. For design simplicity, WPP is not allowed to be used in combination with tiles (although these features could, in principle, work properly together).

Decoder Complexity Trends

Entropy Decoding:

Entropy decoding becomes a bottleneck at high bit rates, and in I slices in particular.

Figure 13:
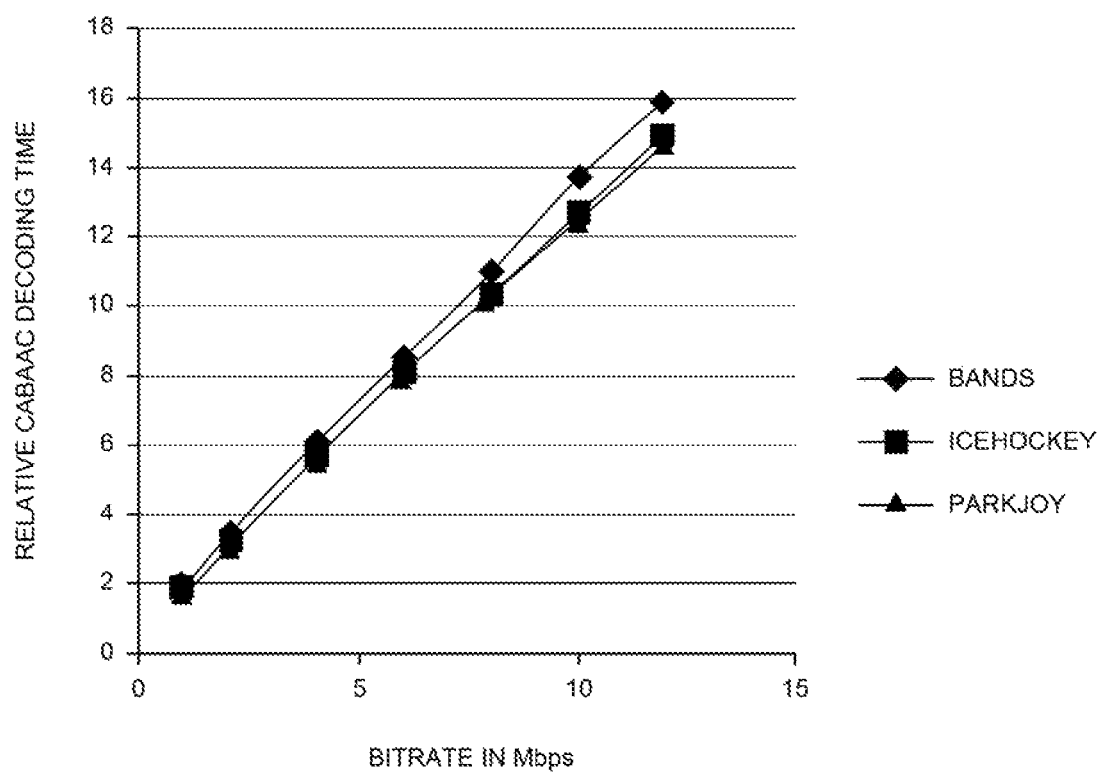
FIG. 13 is a diagram illustrating the increase of entropy decoding time with respect to increase in bitrate of stream.

FIG. 13 is a diagram illustrating the increase of entropy decoding time with respect to increase in bitrate of stream, for three representative streams (bands, ice hockey, parkjoy). Note that as the bit-rate increases, the number of bits to be entropy decoded increases and hence the percentage of the total decoding time that is taken up by increases in entropy decoding alone. This result indicates that entropy decoding time with respect to bitrate R may be represented as the linear function:

$$C_{Entropy} = a_1 \cdot R$$

Effect of Block-Sizes on Decoder Complexity:

It has been discovered that whenever an encoder selects smaller block sizes to create a stream or parts thereof, additional burden on the decoder is imposed. The selection of lower blocks sizes can occur due to lower values of $Q_p$, a higher bitrate targeted via rate-control, or due to specific decisions an encoder makes at points in the video signal when it performs the quality-bitrate optimization.

Figure 14:
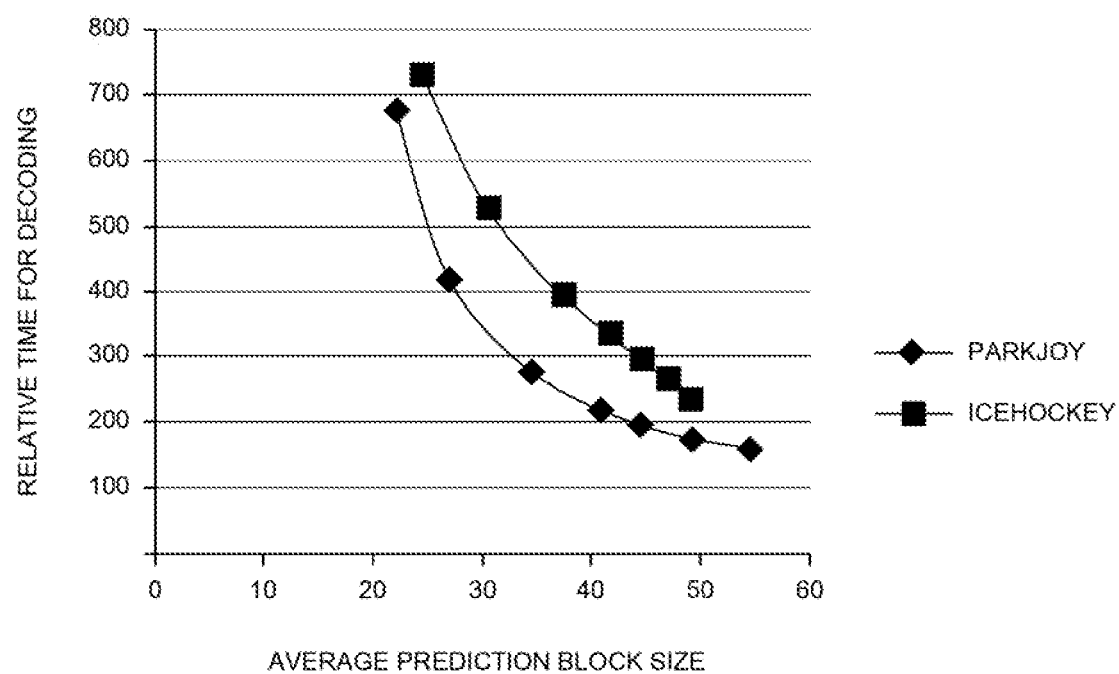
FIG. 14 is a diagram depicting relative decoding time versus the average block size of the prediction blocks.
Figure 15:
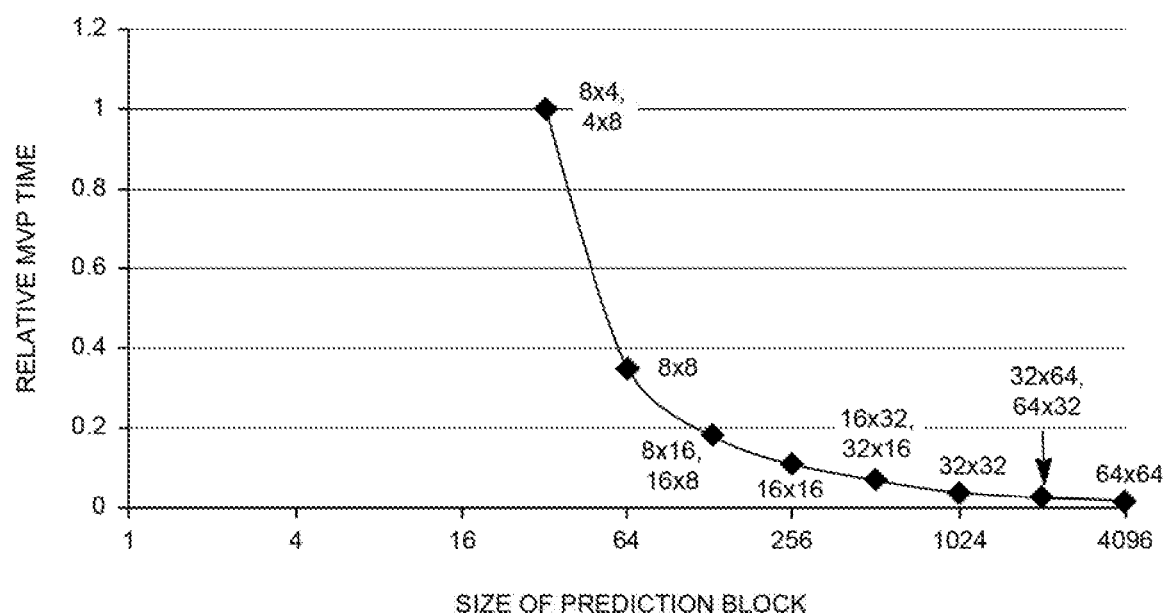
FIG. 15 is a diagram illustrating the relative motion vector prediction time per sample versus prediction block size.

FIG. 14 is a diagram depicting relative decoding time versus the average block size of the prediction blocks. Discoveries have been made with respect to different modules of the decoder, specifically:

1. Motion Vector Prediction (MVP): The motion vector prediction time increases with smaller block sizes. Increase in number of prediction blocks scales up the overall number of candidates to be evaluated. FIG. 15 is a diagram illustrating the relative motion vector prediction time per sample versus prediction block size. Note that the motion compensation time per sample increase with smaller block sizes, as smaller block sizes need increased loads from reference frames.

Figure 16:
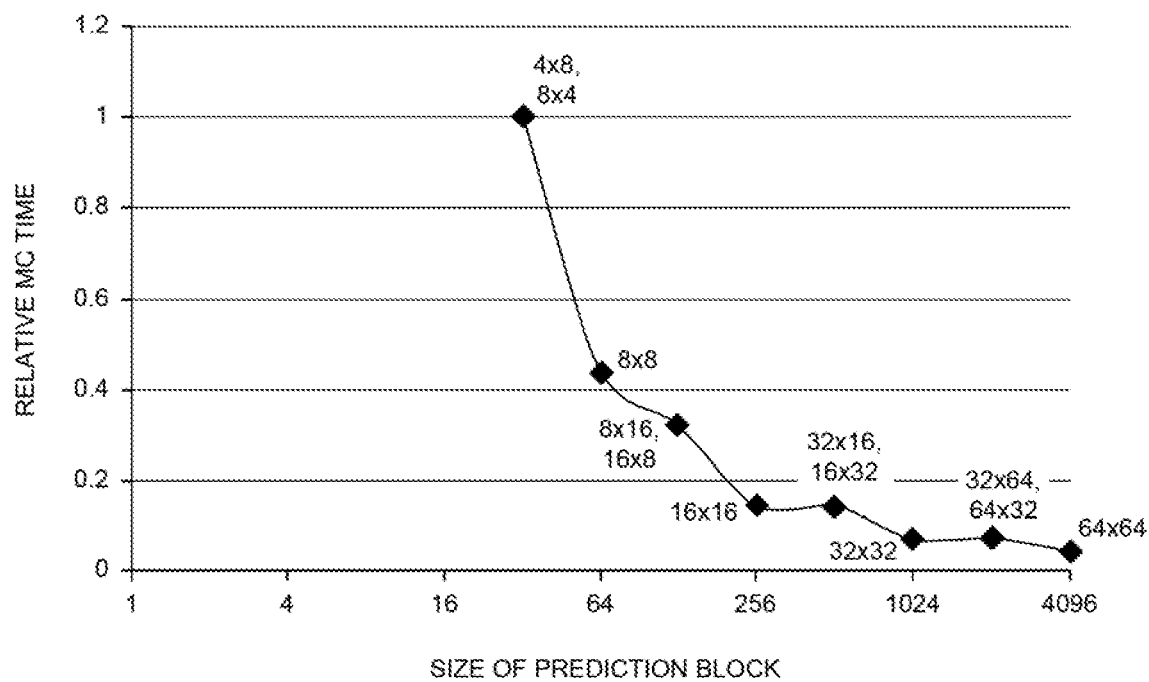
FIG. 16 is a diagram depicting a relative time required to compute motion compensation per sample versus the size of the prediction block in pixels.

2. Motion Compensation: The motion compensation time required per sample increases with smaller block sizes, as smaller block sizes will increase the loads from reference frames. FIG. 16 is a diagram depicting a relative time required to compute motion compensation per sample versus the size of the prediction block in pixels. This results in a discovery regarding decoder complexity. From the figures discussed above involving prediction block size, we can see empirically see that:

$$\text{Prediction block size} \cdot \text{Decoder complexity(MC, MVP)} \approx \text{constant}$$

wherein the prediction block size is expressed in terms of a product of the number of samples or pixels in an x direction and the number of samples or pixels in the y direction. Thus:

$$\text{Decoder complexity per sample(MC,MVP)} = C_{(MC,MVP)} = a_2/\text{Prediction block size}$$

wherein the prediction block size is in pixels.

Figure 17:
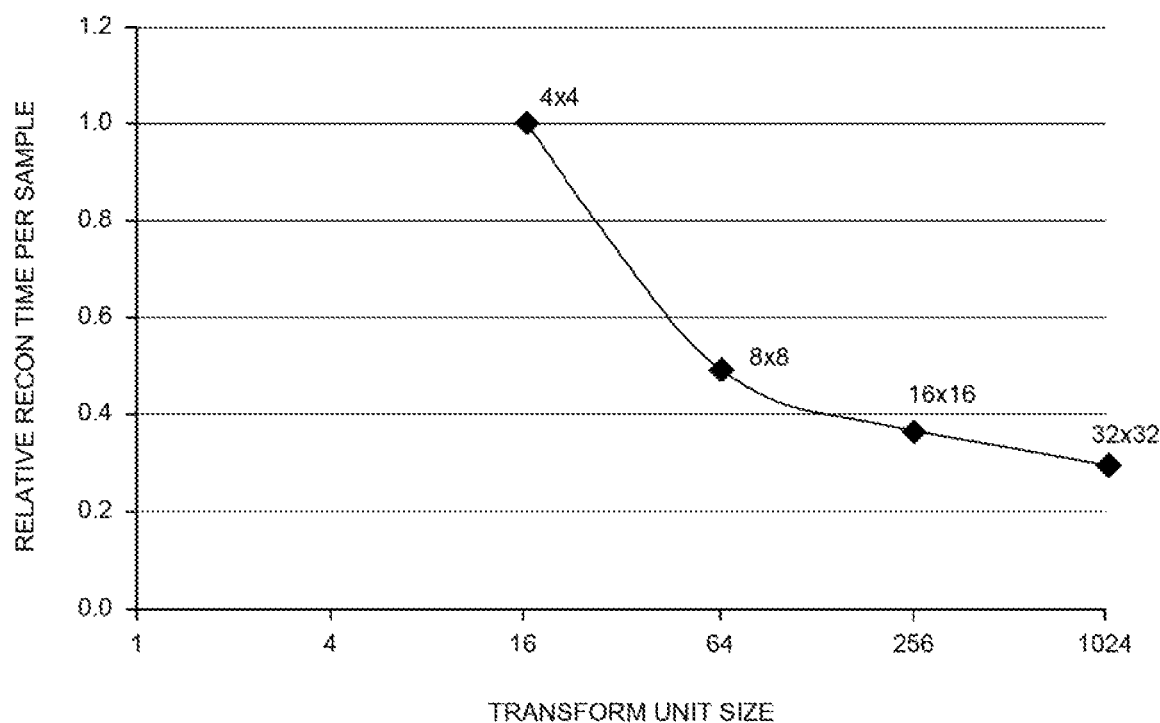
FIG. 17 is a diagram of the reconstruction time per sample versus transform block sizes.

Reconstruction:

The reconstruction time per sample, which is the time required for addition of the residual to the motion compensated predictor, increases with smaller block sizes in the case of the optimized decoder. For the pre-optimized version of the decoder, this was found to be constant. Parallelization by SIMD was found to be more effective for larger block sizes. Hence the time per sample decreases with increasing block size for the SIMD optimized decoder. FIG. 17 is a diagram of the reconstruction time per sample versus transform block sizes.

Figure 18:
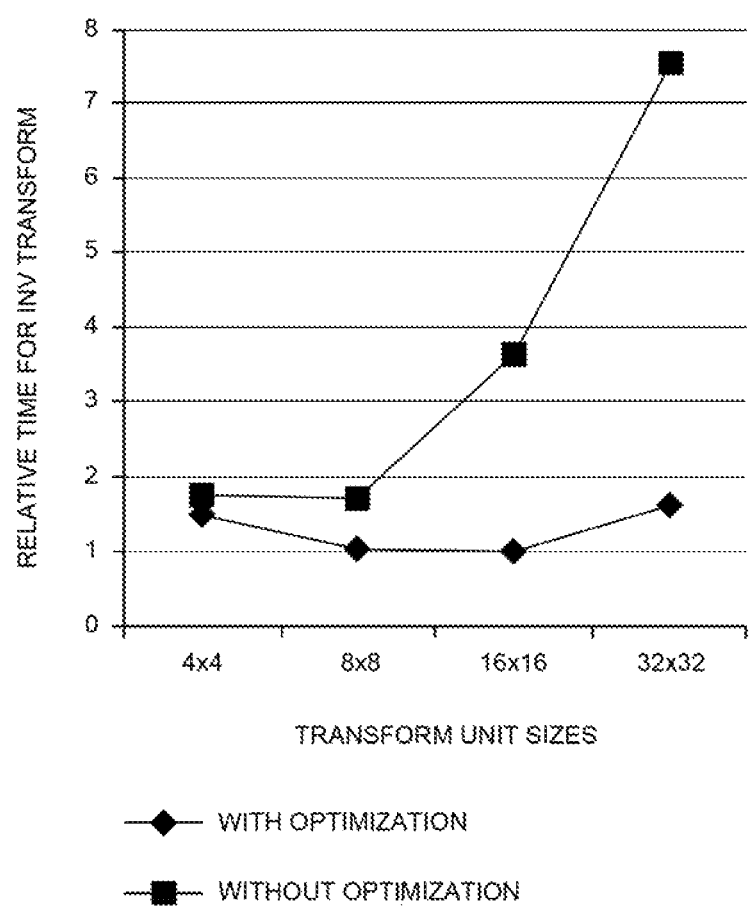
FIG. 18 is a diagram presenting the relative time for the decoder to perform inverse transformations as a function of transform block size.

Inverse Transform and Scaling:

Scale and inverse transform where SIMD optimizations are not done tend to show an increase in processing time per sample for larger blocks sizes. However with SIMD optimizations the processing time per sample is almost constant. FIG. 18 is a diagram presenting the relative time for the decoder to perform inverse transformations as a function of transform block size. With regard to decoder complexity, it can be seen from the above transform block size-related results that:

$$\text{Transform block size} \cdot \text{Decoder Reconstruction complexity per sample} \approx \text{constant}$$

wherein the transform block size is in terms of (number of samples in x direction*number of samples in y-direction)

$$\text{Decoder Reconstruction complexity per sample} = a_3/\text{Transform block size}$$

Choice of $Q_P$ (Quantization Parameter) to Use Multi-Level Significance:

The quantization parameter $Q_P$ is signaled by a flag known as a coded_block_flag. The significance of the coded_block_flag depends on the level as follows:

Level0: coded_block_flag is signaled for each TB (transform block) to specify the significance of the entire TB.

Level1: (intermediate level): if coded_block_flag=1 then each TB divided into 4×4 coefficient groups (CG) where the significance of the entire CG is signaled (by coded_sub_block_flag) as follows:

a) The coded_sub_block_flag syntax elements are signaled in reverse order (from bottom-right towards top-left) according to selected scan.

b) The coded_sub_block_flag is not signaled for the last CG (i.e. the CG which contains the last level). Motivation: a decoder can infer significance since the last level is present.

c) The coded_sub_block_flag is not signaled for the group including the DC position Level2: If coded_sub_block_flag=1 then significant coeff flag are signaled to specify the significance of individual coefficients as follows:

a) The significant coeff flag are signaled in the reverse order (from bottom-right towards top-left) according to selected scan.

In one embodiment, the choice of a $Q_P$ takes into account:

1. How much distortion it incurs;
2. How many bits it takes to code a specific transform block;
3. Whether there is an opportunity to reduce client-decoder-complexity by leveraging opportunities to have zero coded_block_flags specify entire TB as zero, or zero coded_sub_block_flag to specify 4×4 coeff groups as zero, or even by adjusting the number of insignificant individual coefficients (the last named choice benefits a few IDCT implementations which may be zero-coefficient aware even if entire block or coefficient group is not all zeros). Slight adjustment of $Q_P$ may help getting more zero blocks/sub-blocks/insignificants without much detriment to quality in block being coded, and the bits saved can be used to improve quality elsewhere. The zero blocks/sub-blocks/insignificant also end up saving decoder-complexity.

FIG. 19 is a diagram of a 16×16 transform unit (TU) having 4×4 coefficient groups. Note that a number of the groups have coefficients that are all zero. As $Q_P$ is chosen to be a larger value, more of the coefficient groups have blocks having all zero coefficients. In the TU illustrated in FIG. 19, a slight change in $Q_P$ may result in the coefficient group 1902 having all zero coefficients, thus reducing the required decoding complexity without significant detriment to the quality of the TU being encoded.

Moving Average to Characterize Decoding Complexity:

We have seen how a decoder's computational complexity is affected by both stream and encoding characteristics. For any given stream, these characteristics are not static. The correlation between bitrate and decoding time across streams with different average bitrates has already been established. As shown below, the bits per frame for one of the 2 Mbps streams, shows a wide variance. When the bits per frame were converted to equivalent values of bitrate (bits per second, for a specific frame rate), it was found that the stream is characterized by an effective bitrate ranging from a high of 24.7 Mbps to a low of 0.12 Mbs. The high degree of correlation between the instantaneous bitrate and instantaneous decoding time per frame can be seen in the following figure. Instantaneous decoding time has a wide variance as the sequence is decoded.

Figure 20:
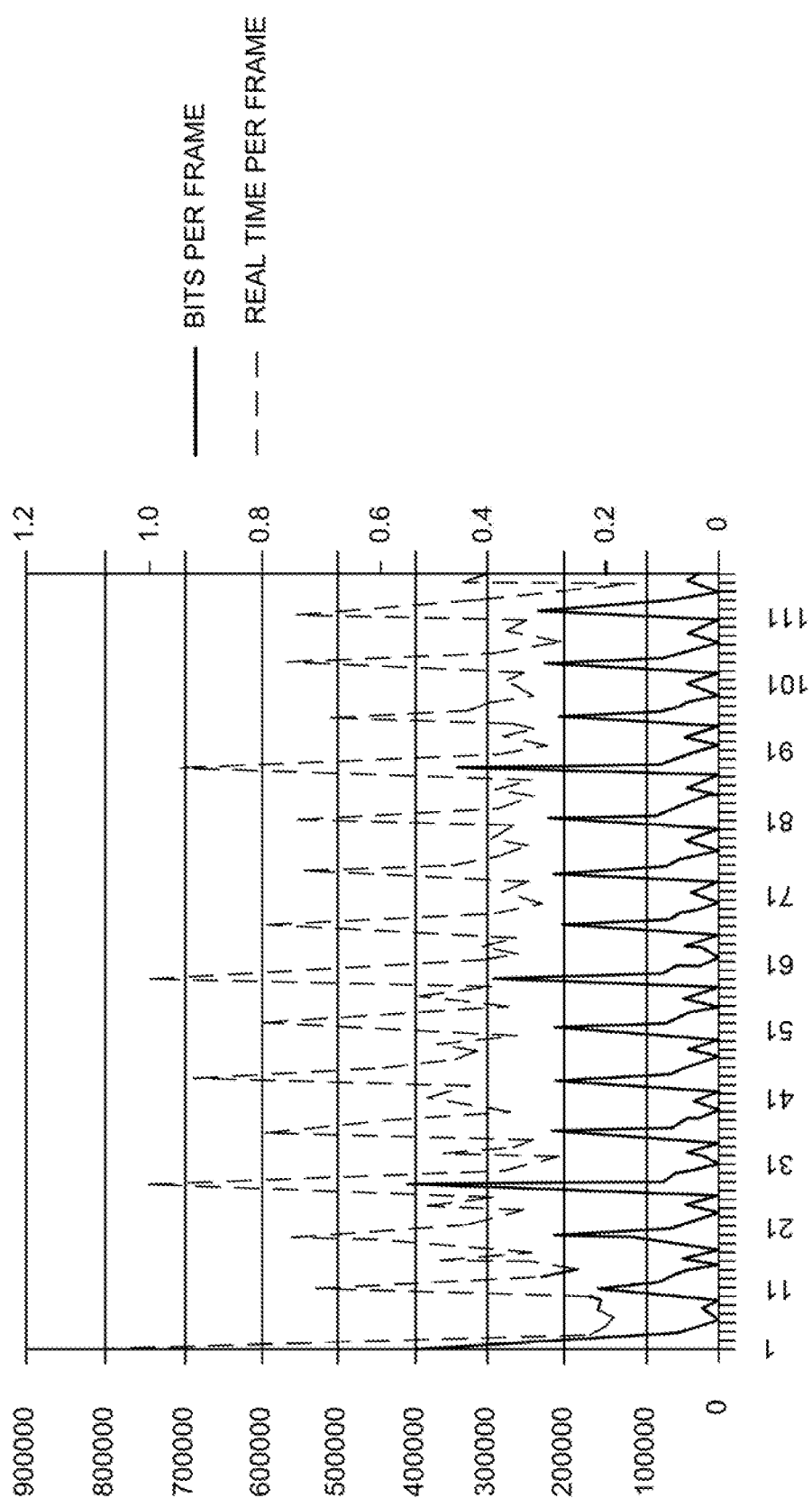
FIG. 20 is a diagram illustrating the correlation between instantaneous bit rate and relative decoding time.

FIG. 20 is a diagram illustrating the correlation between instantaneous bit rate and relative decoding time. Typically a decoder is designed to accommodate the uneven input rate of the encoded bitstream by introducing an initial latency and buffering up the decoded frames. The size of the buffer is dictated by the initial latency that one can tolerate and the memory constraints the system may have. Under these constraints let us say a buffer size of N frames is chosen. The rate at which this buffer is filled by the decoder can thus be tracked using the moving average over N frames of the rate at which the frames are decoded. If this rate is greater than the rate at which the buffer needs to be rendered, a smooth playout of decoded video is guaranteed. Hence we have used the min(MAN) as a measure of the decoder performance for a given stream. For instance, for a set of 720p30 streams, if min(MAN)>30, we can be assured of a smooth playback, where the value of N may be determined on a specific platform, as say 16.

Figure 21:
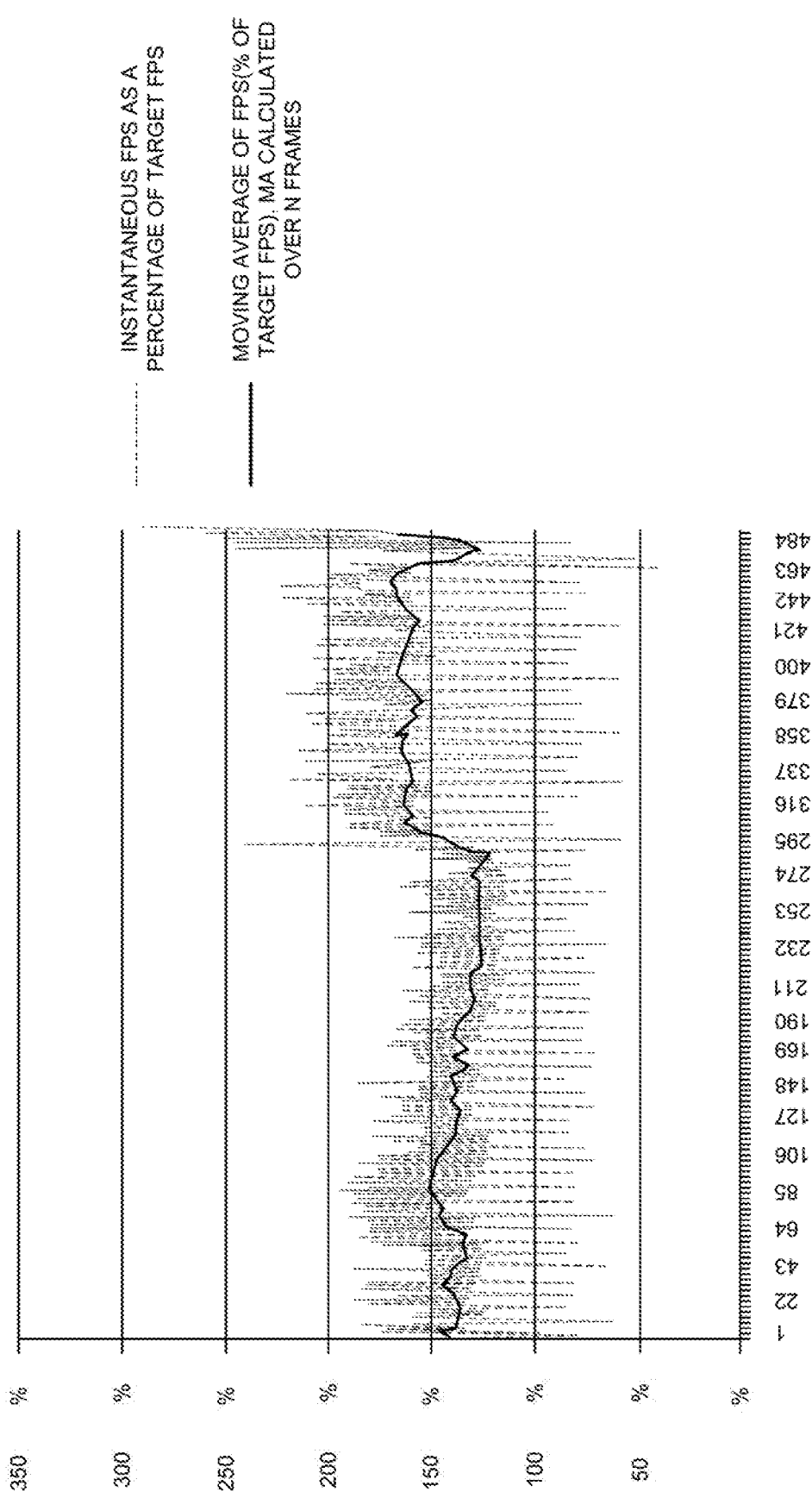
FIG. 21 is a diagram illustrating moving average frame rate as applied to characterizing decoder complexity.

FIG. 21 is a diagram illustrating moving average frame rate as applied to characterizing decoder complexity. The Y axis is in units of percentage of target instantaneous frame rate (frames per second or FPS), wherein 100% is the target FPS. One plot is of the instantaneous FPS, while the smoother plot is that of the moving average (MA) of the FPS (% of the target FPS) computed over N frames. The X axis indicates the frame number, and represents time. Exemplary target FPS and N are 30 fps and 16 frames, respectively.

Since the frame rate (or FPS) is inversely related to the decoding time, it can be seen that though the instantaneous FPS sometimes dips below the target FPS, the moving average FPS is consistently above the target FPS (100% mark). This is the effect of the aforementioned buffering, by virtue of which, there were no visible jitters (no dropped frames) while viewing the decoded frames.

In terms of the impact on encoding, an encoder would need to take into account the buffer size N over which, when a moving average is calculated, the minimum of this moving average of decoding speed must be ensured to be greater than the rate at which the buffer needs to be rendered, to ensure smooth playback. In other words, the moving average of per-frame-costs (associated with decoding complexity) must be lesser than a target device decoding complexity cost. Since encoding is done frame by frame, the cumulative actual costs of the frames encoded along with a cost-reservoir can be used to track the remaining "cost budget" available and needing to be adhered to.

A typical value for N for a "live" media program may be 10 frames, while a time-shifted live media program (for example, with a time shift of a few seconds) may have a greater value for N. A media program that is provided on demand (e.g. video on demand or VOD) may be permitted to have an even greater value for N.

A smaller value for N may also demand that the encoder keep tighter control over the decoding complexity involved, in whatever stream it generates (i.e. peak and average decoder-complexity cannot be very spread apart). On the other hand, if the use-case can afford a larger N, the peak and average decoder complexity can be quite spread apart. By modelling the N at encoder side, the decoder's peak and average complexity of decoding get modelled during encoding process.

Parallelism Aware Strategies:

In one embodiment rule-based strategies are employed to optimize the encoding considering the parallelization opportunities available to a client target decoding device. These strategies are presented in Table I below:

TABLE I

Parallelism Strategies

| Rule Antecedent | Rule Consequent | Comments |
|---|---|---|
| Target Client Profile has multiple cores for parallel execution | Encode the video breaking it into approximately equal sized tiles. Number of tiles can be equal to or greater than number of available cores. Choose aspect ratio tending to square tiles since square tiles have high area/perimeter ratio square tiles and hence are more beneficial than rectangular ones (the perimeter represents the boundaries where the dependencies are broken). | Encoder chooses number of tiles based on available number of cores at a target client, specifies respective entry points in terms of byte offsets. aspect ratio tending Note: All dependencies are broken at tile boundaries. The entropy coding engine is reset at the start of each tile and flushed at the end of the tile. Only the deblocking filter can be optionally applied across tiles, in order to reduce visual artifacts. |
| Target Client Profile has multiple cores for parallel execution with sophisticated synchronization capabilities between cores and/or shared cache | Encode video using wavefront parallel processing by dividing each frame into rows of CTUs. No breaking of dependencies across rows of CTUs Good for architectures with shared cache, e.g. overlapping of search areas. Frequent cross-core data communication, inter-processor synchronization for WPP needs sophisticated synchronization capabilities. | The context models of the entropy coder in each row are inferred from those in the preceding row with a small fixed processing lag (context models are inherited from the second CTU of the previous row) Entropy coding memory is flushed after the last CTU of each row, making each row to end at byte boundary. |
| Target Client profile does not have multiple cores | Encode, modeling the decoding complexity of individual modules | Modeling as describe in "Entropy Encoding," "Effect of block-sizes on decoder complexity," "Reconstruction," and "Inverse Transform and Scaling," sections, including choice of Qp. |

Exemplary Cost Formulations

Typical encoders use the following rate-distortion optimization formula for selection of encoding modes and methods:

$$J = D + \lambda R$$

wherein J is a measure of the cost of encoding the video data, R indicates the number of bits needed for encoding the block, D is a measure of the distortion for the selected encoding mode or method, $\lambda$ represents a Lagrangian factor that represents slope of the RD curve.

Considering all blocks, total distortion in reconstructed video frame, D is given by $D = \Sigma_i D_i^{n_i}$ and the total bit rate is given by $R = \Sigma_i R_i^{n_i}$. For simplicity, in the formulation $J = D + \lambda R$ we may let J, R, D, and $\lambda$ denote respective parameters for a block under consideration.

In order that target decoder complexity may be considered, the above formulation may be modified as follows:

$$J = D + \lambda R + \mu C_T$$

which represents a total cost of the encoding modes/methods to encode the block, and considering a particular decoding complexity cost. In the foregoing representation, $C_T = \Sigma_i C_i^{n_i}$, wherein $C_i^{n_i}$ denotes the target decoder complexity cost factor for the block $n_i$. If a simple rate optimization were used, the optimization would be made subject to a rate constraint $R \leq R^{budget}$, where $R^{budget}$ is the targeted bit rate. But with decoder-complexity optimization, the equation above is optimized subject to the constraint that $C_T \leq C^{budget}$, where $C^{budget}$ is the targeted decoder complexity.

From the above analysis, the following cost models are determined.

$C_{CABAC} = a_1 \cdot R$ $C_{MC,MVP} = a_2$ (wherein $C_{MC,MVP}$ is aggregated for all samples of a block)

$C_{Recon} = a_3$ (wherein $C_{Recon}$ is aggregated for all samples of a block)

$C_{IDCT} = a_4$ $C_{deblock,SAO} = a_5$

And therefore, for these identified decoding cot models, $\Sigma_i C_i^{n_i}$ becomes:

$$C_T = C_{CABAC} + C_{MC,MVP} + C_{IDCT} + C_{Recon} + C_{deblock,SAO}$$

The plots previously depicted illustrate relative decoding complexity within a module of the target decoding device, with respect to each dependent parameter. In one embodiment, these relationships are weighted to account for the relative fraction of the total decoding time they account for.

Figure 22:
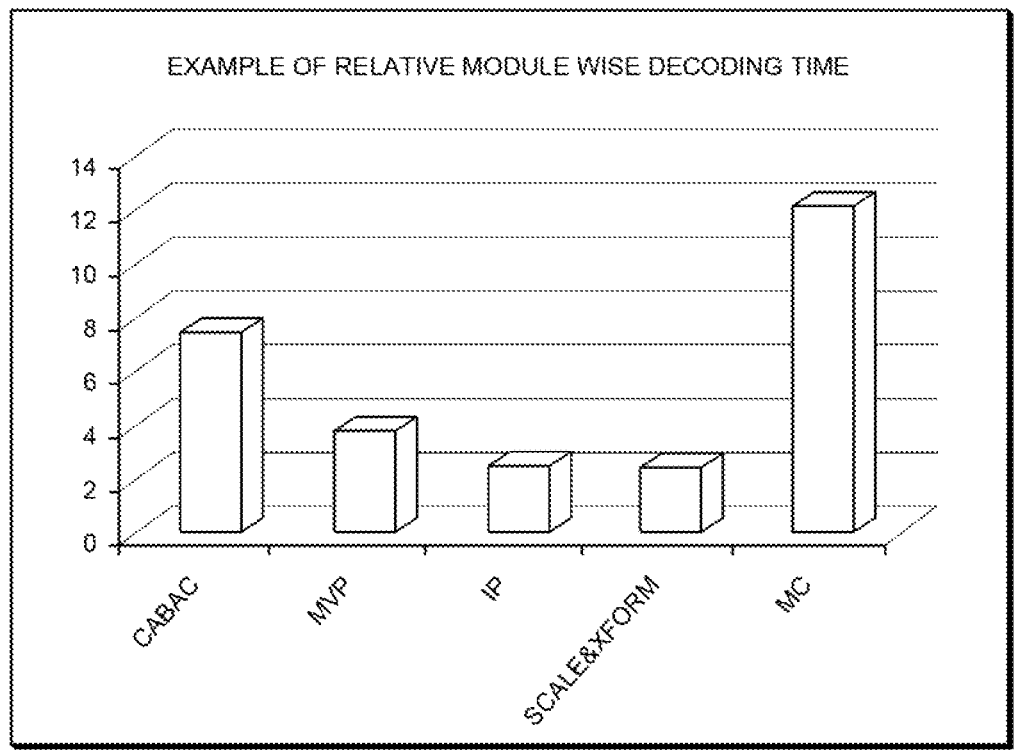
FIG. 22 is a diagram illustrating an exemplary representation of the contribution of various decoding module functions to the total time to decode the media program.

FIG. 22 is a diagram illustrating an exemplary representation of the contribution of various decoding module functions to the total time to decode the media program. Note that motion compensation and motion vector prediction (MC and MVP) together account for a significant amount of decoding time, with entropy-related processing accounting for much of the remainder. Experiments performed with different video streams indicates that the following empirical values work well.

$a_1 = 0.25$
$a_2 = 0.45$
$a_3 = 0.01$
$a_4 = 0.07$
$a_5 = 0.15$

In the above formulations, the encoding mode/method is determined such that distortion, rate, and target decoder complexity are jointly optimized. This may be accomplished by iteratively determining the combination of encoding modes/methods and optimizing for J, in the process also adding the complexity factors $C_i$ for individual modes/methods of blocks within a slice or a frame, and comparing the obtained total complexity with a target complexity cost factor for each slice or frame.

In view of the moving average perspective to characterize decoder complexity, the encoder needs to not only keep an account of the running costs over the immediate frame being encoded, but also needs to ensure that the moving average cost, over a chosen number of frames, does not exceed a decoding complexity cost budget. For this, the cumulative actual costs of the frames encoded along with a cost reservoir can be used to track the remaining cost budget available and needing to be adhered to. This moving average can be defined such that the moving average of $C_T$ computed over N frames is less than or equal to a budget for the moving average of $C_T$, or:

$$\overline{C_T|_N} \leq \overline{C_{T_{budget}}}$$

Applications

Use-Case—Adaptive Streaming:

One potential application of the foregoing principles relates to video streaming scenarios. HTTP Live streaming and MPEG DASH are exemplar adaptive streaming technologies of today. Currently, the video-audio (A/V) content is typically broken into small chunks spanning a few seconds each. In the presently supported adaptive streaming, the client can switch between chunks encoded at different bitrates based on the network conditions available at the client.

In many managed networks that offer video streaming, bandwidth is not severely constrained or fluctuating, but there remains need for complexity scalability as further explained below. The foregoing principles can be used to encode different versions of the video content in accordance with different decoding-complexity profiles. For example, consider a situation where there are three versions of HEVC high definition video content envisioned to be encoded in accordance with three different decoding-complexity points (not necessarily at different bitrates). Further, let version A of the bitstream be associated with the lowest decoding complexity, version B with medium decoding complexity, and version C with maximum decoding complexity. The information on decoding complexity of each version can be contained in the manifest file (playlist file in HLS and MPD in DASH), or in parameter sets. In one embodiment, a single core target decoding device or client could choose to consume version A, a dual core target decoding device or client choose version B, and a quad-core target device or client choose version C. In another embodiment, as the battery power remaining with a specific mobile client reduces as it discharges causing it to switch from version A through version C. Our invention pertains to the method by which an encoder generates streams corresponding to different decoder-complexity operating points.

Figure 23A:
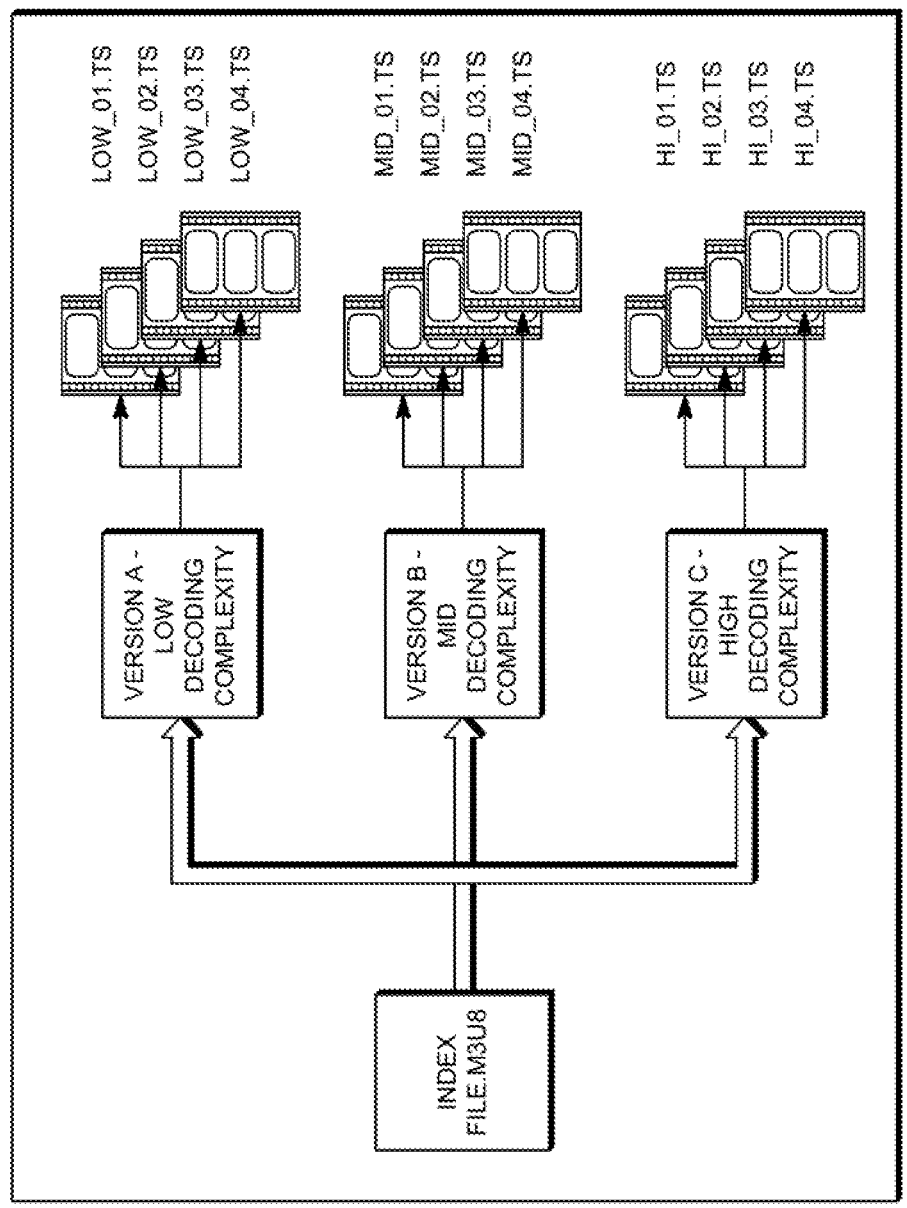
FIGS. 23A-23B are diagrams illustrating the use of variants to provide streams with varying decoding complexities.
Figure 23B:
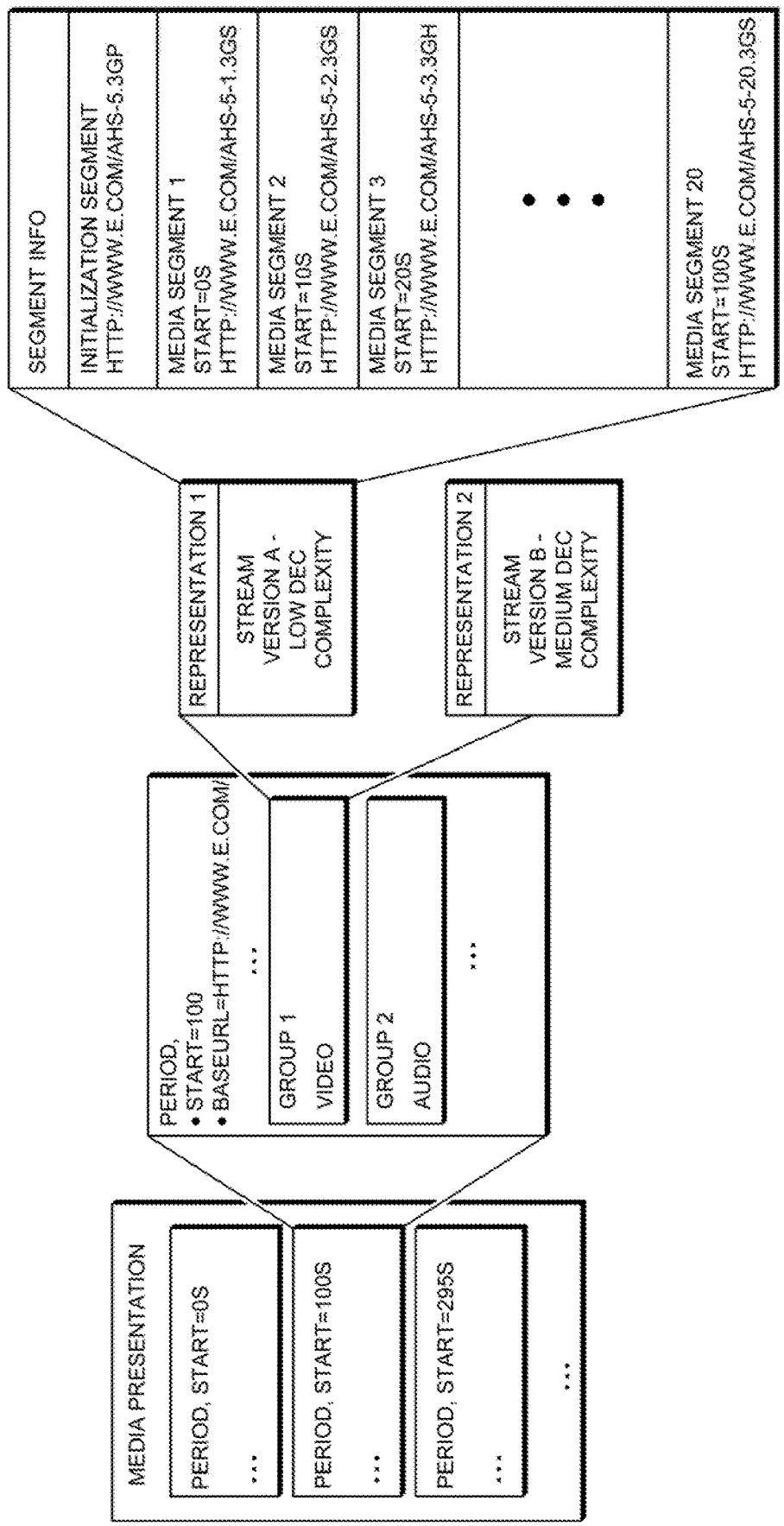

FIGS. 23A and 23B are a diagrams illustrating the use of variants to provide streams with varying decoding complexities. FIG. 23A illustrates an HLS embodiment, while FIG. 23B presents a DASH embodiment. In DASH, the multiple representations can be used in future to contain representations of streams corresponding to different decoding complexities.

Use-Case—Scalable Video/Scalable-HEVC:

Another use-case where the foregoing principles can be readily applied is to support a scalable extension of HEVC.

In addition to the scalability in the dimensions of resolution, bitrate, quality, temporal/frame-rate, the methods describe above allow an encoder to generate layers of streams, each layer pertaining to a different decoder-complexity. Typically, each layer is incremental to the previous layer in terms of information contained.

For example, consider three layers: D1, D2 and D3. In one embodiment, a single core client target decoding device could choose to consume the layer corresponding to the lowest de-complexity version D1. A dual core client target decoding device could consume layer D1 as well as an incremental layer D2, wherein D1 and D2 are combinedly associated with an intermediate decoding complexity that the dual core client decoding device is equipped to handle. A quad-core client decoding device could consume layers D1, D2 and D3, wherein D1, D2 and D3 together are associated with a higher decoding complexity than the quad core client decoding device is equipped to handle. In another embodiment, layer selection may be performed as a function of remaining battery power in the client target decoding device. As the remaining battery power declines the client target decoding device may switch from a high decoding complexity stream containing (D1, D2, D3) to a medium decoding complexity stream containing (D1, D2) and as power further declines, finally switch to decoding the low complexity stream having only D1. The techniques presented above allow the encoder to generate the aforementioned layered scalable stream corresponding to different decoder-complexity operating points.

Figure 24:
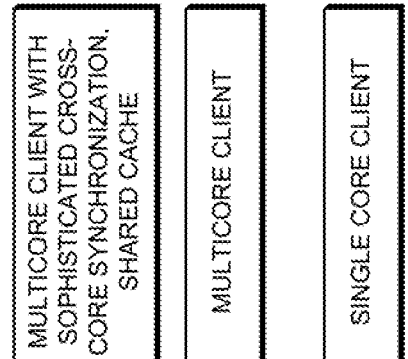
FIG. 24 is a diagram illustrating the principle of upper layers having greater detail than lower layers.

The result is that each layer of the stream adds details missing from the hierarchically lower layer. For example, when reproduced, layer D1 has fewer details than layer D2, which has fewer layers than level D3. FIG. 24 is a diagram illustrating the principle of upper layers having greater detail than lower layers.

Use-Case—Device Profiles:

In another embodiment, the encoder encodes different versions of the encoded stream using parallelism techniques, with each version based on a different target decoding device profile (e.g. each version is suitable for a target decoding device of a particular class.

Figure 25:
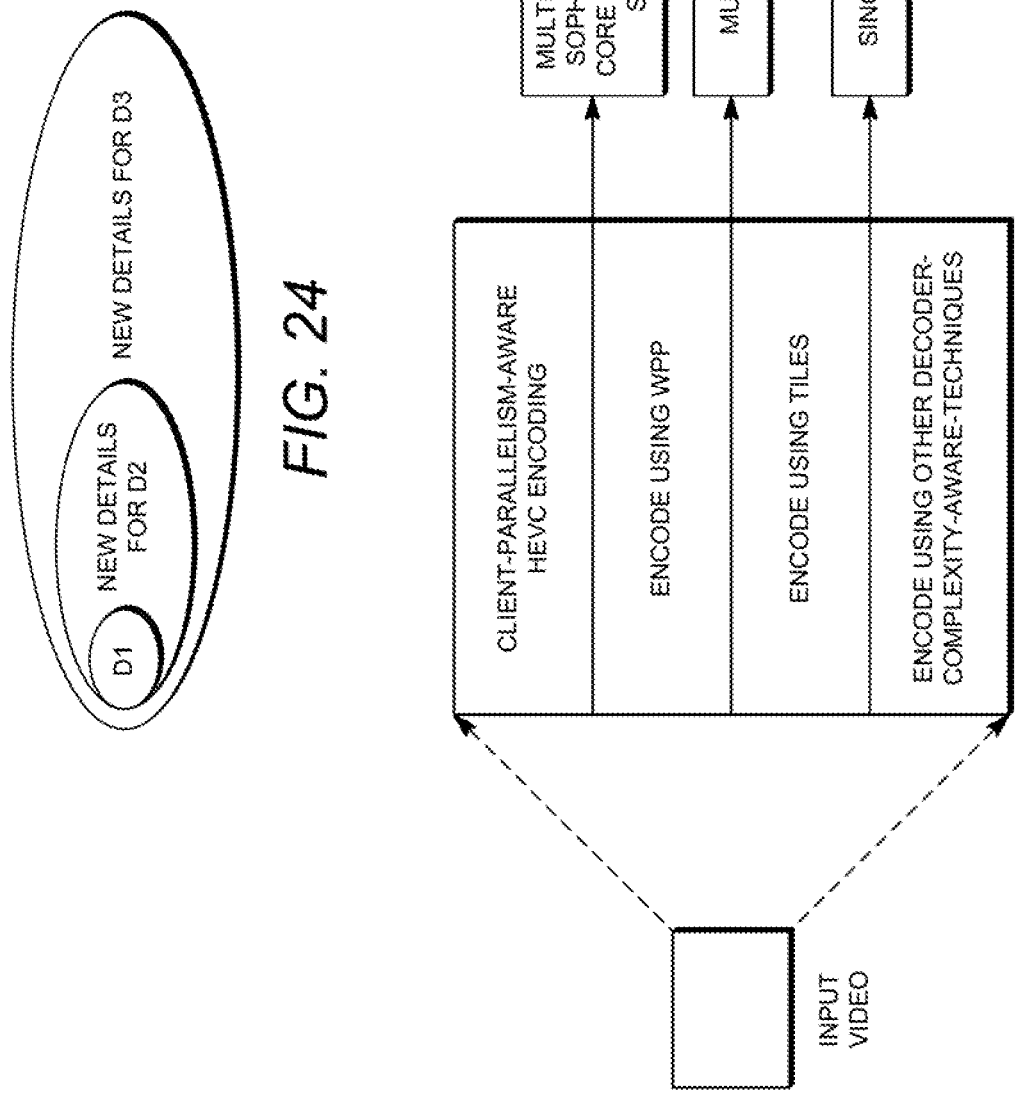
FIG. 25 is a diagram depicting the selection of an HEVC parallelism tool based upon the capabilities of target devices belonging to different classes.

FIG. 25 is a diagram depicting the selection of an HEVC parallelism tool based upon the capabilities of target devices belonging to different classes. As illustrated, if the target decoding device class is a multicore (having a plurality of processing cores) encoding device having sophisticated synchronization capabilities between cores and/or shared cache, the encoder may encode the video stream using WPP. If the target decoding device class includes devices with a plurality of processing cores but without synchronization capabilities, the encoder may encode the video stream using tiles, but not WPP. Further, if the target decoding device class includes devices with only a single processing core, the media program may be encoded without using tiles or WPP, but the other decoding complexity aware techniques described above may be used.

Figure 26:
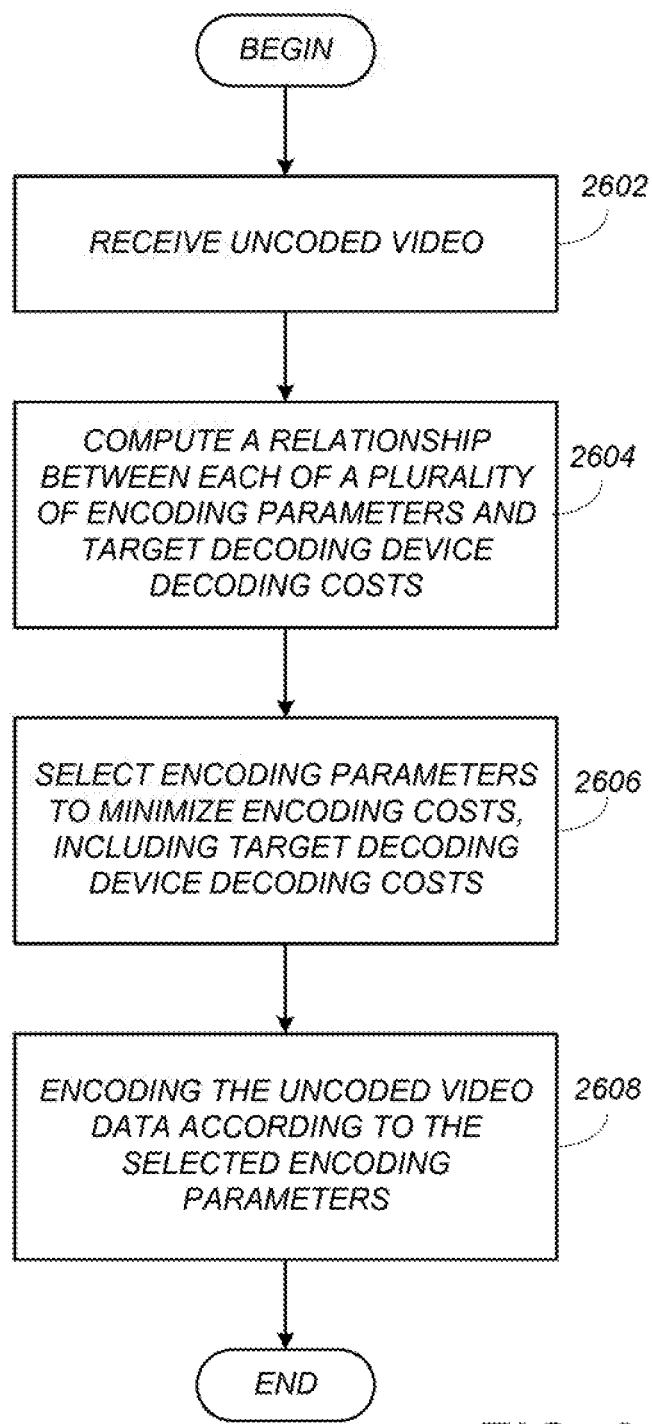
FIG. 26 is a diagram illustrating exemplary process steps that can be used to implement one embodiment of the coding scheme.

FIG. 26 is a diagram illustrating exemplary process steps that can be used to implement the coding scheme described above. The uncoded video such as AV information 102 is received, for example, by a source encoder 202, as shown in block 2602. A relationship is computed between each of a plurality of coding parameters and target decoding device decoding costs. This can be accomplished, for example, as described in FIG. 27.

Figure 27:
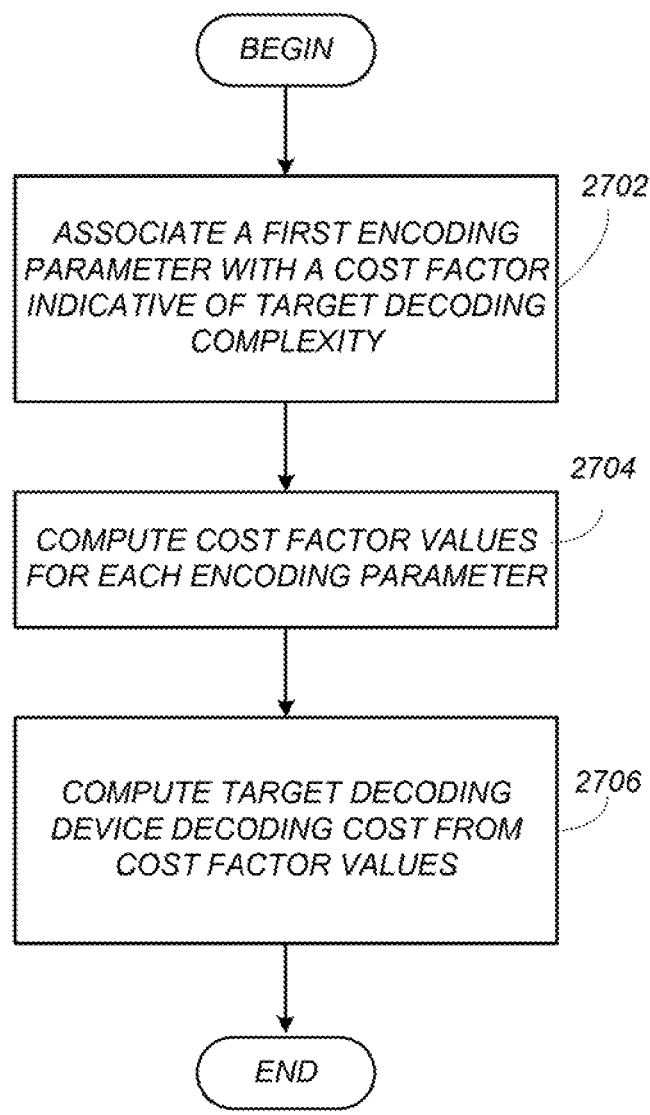
FIG. 27 is a diagram illustrating exemplary process steps that can be used to compute a relationship between each of the plurality of coding parameters and the target decoding device decoding costs.

FIG. 27 is a diagram illustrating exemplary process steps that can be used to compute a relationship between each of the plurality of coding parameters and the target decoding device decoding costs. In block 2702, one or more encoding parameters is associated with a respective cost factor indicative of a target decoding device decoding complexity. For example, in one embodiment, one or more of the following decoding costs/encoding parameter associates may be made: (1) an entropy decoding cost ($C_{ENTROPY}$) associated with the bit rate encoding parameter, (2) a motion vector and compensation complexity cost ($C_{MC,\ MVP}$), associated with the prediction block size, (3) a reconstruction time cost ($C_{RECON}$), associated with the transform unit size, and (4) an inverse discrete cosine transfer cost ($C_{IDCT}$), associated with the quantization factor of the transform block, as described above.

In block 2704, the cost factor values are computed for each encoding parameter. For example, (1) an entropy decoding cost ($C_{ENTROPY}$) value may be computed for one or more bit rate encoding parameters, (2) a motion vector and compensation complexity cost ($C_{MC,\ MVP}$) may be computed for one or more prediction block sizes, (3) a reconstruction time cost ($C_{RECON}$) can be computed for one or more transform unit sizes, and (4) an inverse discrete cosine transfer cost ($C_{IDCT}$) can be computed for one or more quantization factors of the transform block(s).

In block 2706, a target decoding device decoding cost(s) are computed from the cost factors values. This can be accomplished, for example, by use of the relationship $C_T = C_{Entropy} + C_{MC,MVP} + C_{IDCT} + C_{RECON}$. Other target device decoding costs may be computed as well.

Returning to FIG. 26, the encoding parameters are selected to minimize encoding costs imposed on the target decoding device. This can be accomplished, for example, by minimizing the encoding cost according to $J = D + \lambda R + \mu C_T$, wherein $C_T = C + C_{MC,MVP} + C_{IDCT} + C_{Recon} + C_{deblock,SAO}$, subject to the constraint that $C_T \leq C^{budget}$, where $C^{budget}$ is the targeted decoder complexity. Scale factors scaling the relative contributions to target decoding device costs may be defined from $C_{Entropy} = a_1 \cdot R$; $C_{MC,MVP} = a_2$ (wherein $C_{MC,MVP}$ is aggregated for all samples of a block); $C_{Recon} = a_3$ (wherein $C_{Recon}$ is aggregated for all samples of a block); $C_{IDCT} = a_4$; $C_{deblock,SAO} = a_5$. In an exemplary embodiment, the constants may be set at $a_1 = 0.25$, $a_2 = 0.45$, $a_3 = 0.01$, $a_4 = 0.07$, and $a_5 = 0.15$. Finally, the uncoded video is encoded according to the selected encoding parameters, as shown in block 2608.

Figure 28:
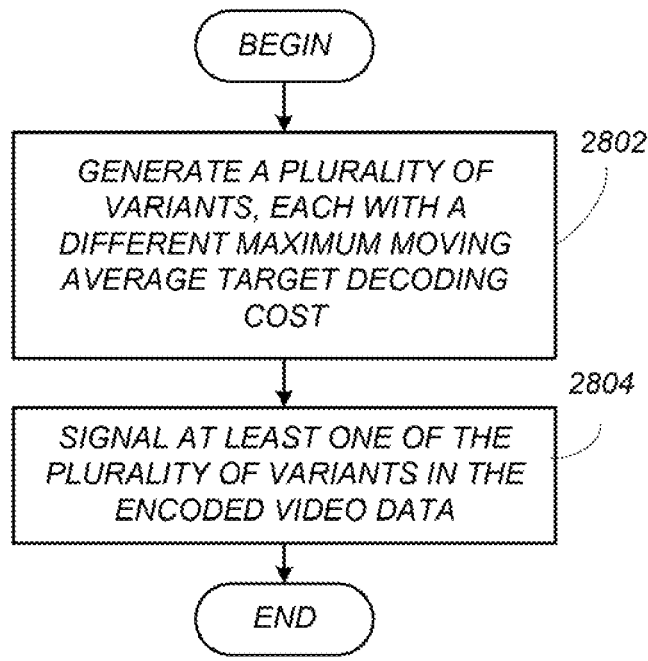
FIGS. 28-29 are diagrams depicting how the uncoded video may be encoded according to the selected encoding parameters.

FIG. 28 is a diagram depicting one embodiment of how the uncoded video may be encoded according to the selected encoding parameters. In block 2802, a plurality of variants are generated, each by performing the operations of blocks 2602-2608 for each variant, with each variant having a different upper bound on the moving average decoding cost. In block 2804, the variants are signaled in the encoded video data.

Figure 29:
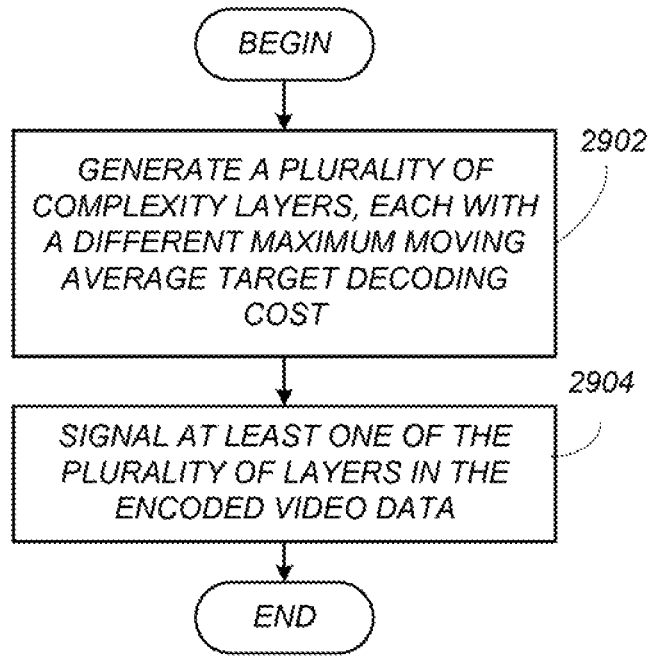

FIG. 29 is a diagram depicting another embodiment of how the uncoded video may be encoded according to the selected encoding parameters. In block 2902, a plurality of complexity layers are generated, each with a different upper bound on the moving average decoding cost. In block 2904, one or more of the plurality of layers are signaled in the encoded video data.

Figure 30:
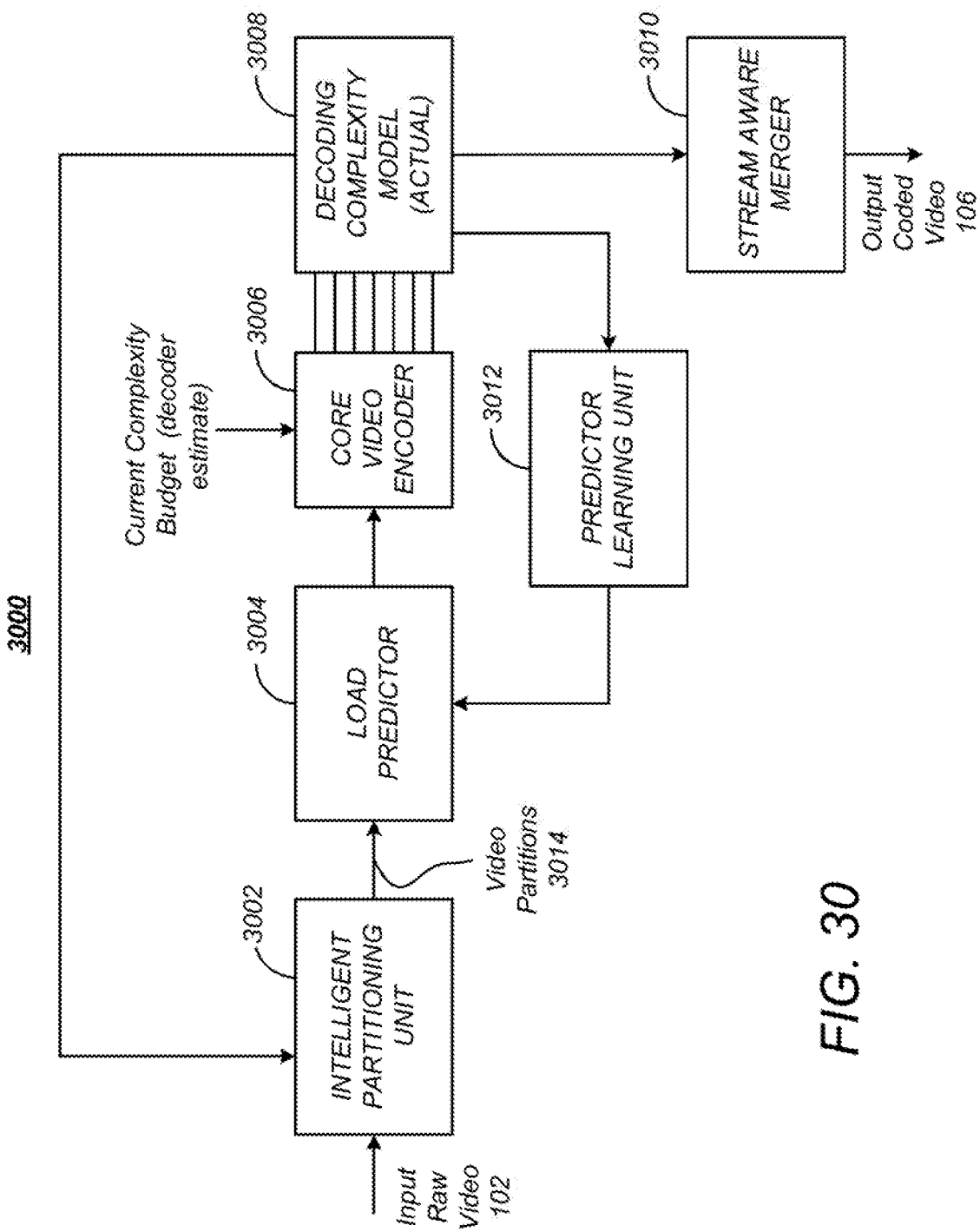
FIG. 30 is a diagram presenting an exemplar architecture of an intelligent encoder for encoding the video data according to target decoding device decoding complexity.

FIG. 30 is a diagram presenting an exemplar architecture of an intelligent encoder 3000 for encoding the video data according to target decoding device 220 decoding complexity.

A raw (unencoded) video stream or AV information 102 having a plurality of input video frames is provided to an Intelligent Partitioning Unit (IPU) 3002. The IPU 3002 splits the input video frames into appropriate partitions 3014 like slices, tiles, wavefronts, each of which can be placed in a task queue. The "intelligent" partitioning performed by the IPU 3002 also includes the aspect of deciding whether tiles or WPP need to be used, based on the use-case described above. The IPU 3002 also accounts for dependencies (if any, say in case of slices) among different partitions, splitting video frames correctly also to ensure that parts of video can be distributed among the units of the parallel architecture responsible for encoding (e.g. among cores of multicore architecture). The IPU 3002 can account for dependencies and perform dependency management for a variety of partitioning schemes.

The load predictor 3004 predicts the system load associated with the decoding at client or target decoding device 220. Learning algorithms such as support vector machines can be used to learn the patterns of the actuals in relation to a learned prediction value, in a training phase, to optimize prediction accuracy in the testing phase. In one embodiment, the load predictor 3004 examines each CTB or each chosen set of CTBs of the incoming video to predict how much complexity the chosen modes (e.g. RDO vs non-RDO based encoding) would account for from a target decoding device 220 perspective.

The core video encoder 3006 takes into account the currently available complexity budget as seen from the perspective of the target decoding device 220. Decoder complexity is adaptively modeled in real or near real time, at least in part using the actual generated payload, using the decoding complexity model 3008, providing actual decoding complexity to the predictor learning unit 3012, for processing. The predictor learning unit 3012 updates parameters in the load predictor 3004.

The stream aware merger 3010 accepts the encoded video partitions and assembles them together in corresponding video streams in the proper order. Temporary header information entered by the IPU 3002 (for example, stream and partition ID) can be removed during by the stream aware merger 3010 in the merging process.

Pre-Categorization

In one embodiment, the intelligent encoder 3000 uses estimated or actual decoding costs to carefully plan the encoding or schedule the available tasks. In other embodiments, the intelligent encoder uses pre-categorization techniques to make quick encoding decisions. In order to speed up the process of selection of the right tools for a given complexity budget, it is useful to classify the encoding options into complexity categories.

FIG. 31 is a diagram illustrating three exemplary complexity categories. The un-crosshatched region denotes encoding options chosen for least decoding effort at the target decoding device 220. This can be used when there is least computational power available at a target decoding device. The double cross-hatched complexity category shows maximum decoding effort at target decoding device 220. This can be used when there is ample computational power available at target decoding device 220. The single cross-hatched complexity category indicates a medium decoding effort at the target decoding device 220 and may be used when the first or second categories are not appropriate. It is envisioned that these decisions are made as dynamically as possible within compliance limits of the standard.

Hardware Environment

Figure 32:
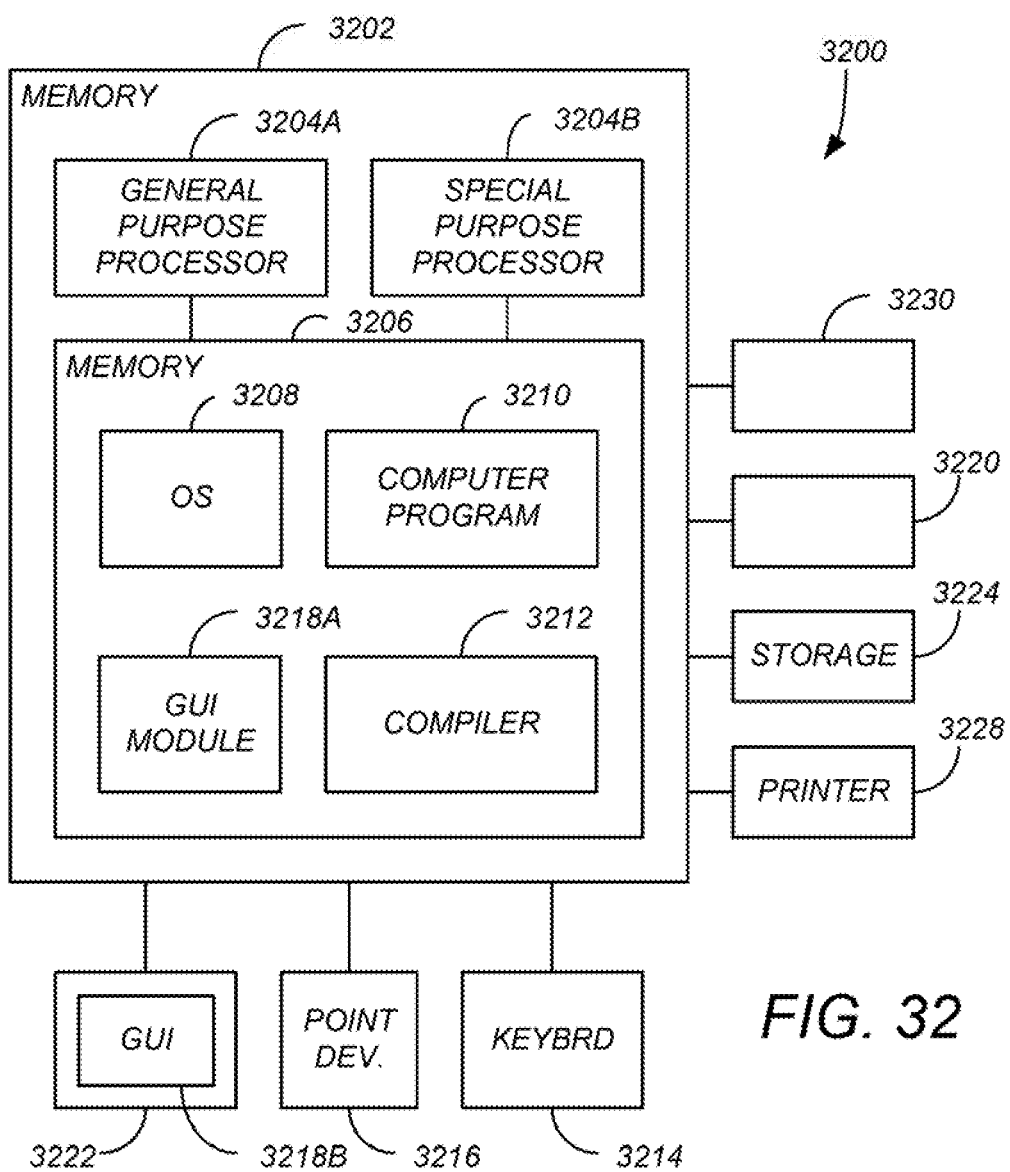
FIG. 32 is a diagram illustrating an exemplary computer system that could be used to implement elements of the present invention.

FIG. 32 is a diagram illustrating an exemplary computer system 3200 that could be used to implement elements of the present invention, including the encoding controller 208 or other device computing the relationship between encoding parameters and target decoding device decoding costs and selecting encoding parameters to minimize encoding costs including target decoding device decoding costs. The exemplary computer system 3200 may also be used to encode the uncoded video 2608 according to the selected encoding parameters or to decode the coded video.

The computer 3202 comprises a general purpose hardware processor 3204A and/or a special purpose hardware processor 3204B (hereinafter alternatively collectively referred to as processor 3204) and a memory 3206, such as random access memory (RAM). The computer 3202 may be coupled to other devices, including input/output (I/O) devices such as a keyboard 3214, a mouse device 3216 and a printer 3228.

In one embodiment, the computer 3202 operates by the general purpose processor 3204A performing instructions defined by the computer program 3210 under control of an operating system 3208. The computer program 3210 and/or the operating system 3208 may be stored in the memory 3206 and may interface with the user and/or other devices to accept input and commands and, based on such input and commands and the instructions defined by the computer program 3210 and operating system 3208 to provide output and results.

Output/results may be presented on the display 3222 or provided to another device for presentation or further processing or action. In one embodiment, the display 3222 comprises a liquid crystal display (LCD) having a plurality of separately addressable pixels formed by liquid crystals. Each pixel of the display 3222 changes to an opaque or translucent state to form a part of the image on the display in response to the data or information generated by the processor 3204 from the application of the instructions of the computer program 3210 and/or operating system 3208 to the input and commands. Other display 3222 types also include picture elements that change state in order to create the image presented on the display 3222. The image may be provided through a graphical user interface (GUI) module 3218A. Although the GUI module 3218A is depicted as a separate module, the instructions performing the GUI functions can be resident or distributed in the operating system 3208, the computer program 3210, or implemented with special purpose memory and processors.

Some or all of the operations performed by the computer 3202 according to the computer program 3210 instructions may be implemented in a special purpose processor 3204B. In this embodiment, some or all of the computer program 3210 instructions may be implemented via firmware instructions stored in a read only memory (ROM), a programmable read only memory (PROM) or flash memory within the special purpose processor 3204B or in memory 3206. The special purpose processor 3204B may also be hardwired through circuit design to perform some or all of the operations to implement the present invention. Further, the special purpose processor 3204B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 3202 may also implement a compiler 3212 which allows an application program 3210 written in a programming language such as COBOL, C++, FORTRAN, or other language to be translated into processor 3204 readable code. After completion, the application or computer program 3210 accesses and manipulates data accepted from I/O devices and stored in the memory 3206 of the computer 3202 using the relationships and logic that was generated using the compiler 3212.

The computer 3202 also optionally comprises an external communication device such as a modem, satellite link, Ethernet card, or other device for accepting input from and providing output to other computers.

In one embodiment, instructions implementing the operating system 3208, the computer program 3210, and/or the compiler 3212 are tangibly embodied in a computer-readable medium, e.g., data storage device 3220, which could include one or more fixed or removable data storage devices, such as a zip drive, floppy disc drive 3224, hard drive, CD-ROM drive, tape drive, or a flash drive. Further, the operating system 3208 and the computer program 3210 are comprised of computer program instructions which, when accessed, read and executed by the computer 3202, causes the computer 3202 to perform the steps necessary to implement and/or use the present invention or to load the program of instructions into a memory, thus creating a special purpose data structure causing the computer to operate as a specially programmed computer executing the method steps described herein. Computer program 3210 and/or operating instructions may also be tangibly embodied in memory 3206 and/or data communications devices 3230, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 3202.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method of encoding video data for decoding on a target decoding device having parallel processing, comprising:

(a) receiving uncoded video data;
(b) computing a relationship between each of a plurality of encoding parameters and target decoding device decoding costs;
(c) selecting HEVC encoding parameters to minimize encoding costs, wherein the encoding costs include the target decoding device decoding costs; and
(d) encoding the uncoded video data according to the selected encoding parameters,
(e) wherein when the target decoding device performs synchronized parallel processing by means of multiple cores, shared cache wavefront-parallel-processing (WPP) is used for encoding as indicated by the selected encoding parameters;
(f) wherein when the target decoding device performs free running parallel processing using multiple cores or shared cache, tiling is used for encoding as indicated by the selected encoding parameters,
(g) wherein free running comprises freely defining a size and shape of the tiles by controlling a number of row and column partitions wherein the selected encoding parameters set the tile size and shape as the wavefront to determine which of the parallel cores are used for processing each of the tiles.

2. The method of claim 1, wherein the encoding parameters are selected subject to a target decoding cost determined on a unit basis, where the unit is a tile or wavefront.

3. The method of claim 1, wherein the encoding parameters are selected subject to an upper bound on moving average decoding cost.

4. The method of claim 1, wherein computing a relationship between each of a plurality of encoding parameters and target decoding device decoding costs comprises:
associating each encoding parameter with a cost factor indicative of target decoding complexity;
computing cost factor values for each encoding parameter;
computing target decoding cost from the cost factor values.

5. The method of claim 1, wherein the encoded video data comprises a plurality of variants of an adaptive bitstream, and the method further comprises:
generating the plurality of variants, by performing steps (a)-(d) for each variant, wherein each of the variants has a different upper bound on moving average decoding cost;
signaling at least one of the plurality of variants in the encoded video data.

6. The method of claim 1, wherein the encoded video data comprises a complexity-scalable video stream comprising a plurality of complexity layers, and the method further comprises:
generating the plurality of complexity layers, by performing steps (a)-(d) for each complexity layer;
signaling at least one of the plurality of complexity layers in the encoded video data.

7. The method of claim 1, wherein the encoded video data comprises a plurality of variants, each variant generated with a different parallelization coding parameter associated with a class of target decoding devices.

8. The method of claim 1, wherein the encoding parameters include at least one of:
a bit rate first coding parameter;
a prediction block size first coding parameter;
a transform unit size first coding parameter; and
a quantization factor ($Q_p$) of a transform block first coding parameter.

9. The method of claim 8, wherein:
the prediction block first coding parameter is selected based on one or more of motion compensation, motion vector prediction and intra prediction processes by the target decoding device;
the transform unit size first coding parameter is selected based on a complexity of one or more of an inverse discrete cosine transform and reconstruction processes at the target decoding device; and
the quantization factor is selected according to a distortion and a number of bits to encode the transform block.

10. The method of claim 8, wherein the target encoding costs ($C_T$) include at least one of:
an entropy decoding cost ($C_{ENTROPY}$) associated with the bit rate encoding parameter;
a motion vector and compensation complexity cost ($C_{MC, MVP}$), associated with the prediction block size;
a reconstruction time cost ($C_{RECON}$), associated with the transform unit size; and
an inverse discrete cosine transfer cost ($C_{IDCT}$), associated with the quantization factor of the transform block.

11. The method of claim 10, wherein the encoding costs are represented by $J=D+\lambda R+\mu C_t$, and wherein:
J is a measure of the encoding costs;
D is a measure of a distortion of the encoded video data;
R is a measure of a number of bits needed to encode a block of the video data;
$\lambda$ is a measure of a slope of a ratio of R and D;
$\mu$ is a decoding complexity weighting factor; and
$C_T$ is a total cost to decode the block of the video data.

12. The method of claim 11, wherein $C_T=C_{Entropy}+C_{MC,MVP}+C_{IDCT}+C_{Recon}$.

13. The method of claim 1, wherein the plurality of encoding parameters includes enabling or disabling of decoder in-loop filtering of the target decoding device.

* * * * *

UNITED STATES PATENT AND TRADEMARK OFFICE
CERTIFICATE OF CORRECTION

| | | |
|---|---|---|
| PATENT NO. | : 10,819,997 B2 | Page 1 of 1 |
| APPLICATION NO. | : 15/002372 | |
| DATED | : October 27, 2020 | |
| INVENTOR(S) | : Shailesh Ramamurthy et al. | |

It is certified that error appears in the above-identified patent and that said Letters Patent is hereby corrected as shown below:

In the Specification

Column 18, Line 43: Replace "significant coeff flag" with --significant_coeff_flag--

Column 18, Line 46: Replace "significant coeff flag" with --significant_coeff_flag--

Column 20, Table 1, Sub-Column: Comments, Line 35: Delete "aspect ratio tending"

Signed and Sealed this
Twenty-first Day of May, 2024

Katherine Kelly Vidal
*Director of the United States Patent and Trademark Office*